(12) United States Patent
Kaji et al.

(10) Patent No.: US 10,793,652 B2
(45) Date of Patent: Oct. 6, 2020

(54) SOLID PMAO COMPOSITION AND METHOD FOR PRODUCING SAME

(71) Applicant: Tosoh Finechem Corporation, Shunan-shi, Yamaguchi (JP)

(72) Inventors: Eiichi Kaji, Shunan (JP); Takeo Yamane, Shunan (JP)

(73) Assignee: Tosoh Finechem Corporation, Shunan-Shi, Yamaguchi (JP)

( * ) Notice: Subject to any disclaimer, the term of this patent is extended or adjusted under 35 U.S.C. 154(b) by 161 days.

(21) Appl. No.: 16/091,284

(22) PCT Filed: Apr. 4, 2017

(86) PCT No.: PCT/JP2017/014113
§ 371 (c)(1),
(2) Date: Oct. 4, 2018

(87) PCT Pub. No.: WO2017/175766
PCT Pub. Date: Oct. 12, 2017

(65) Prior Publication Data
US 2019/0153127 A1    May 23, 2019

(30) Foreign Application Priority Data

Apr. 5, 2016  (JP) .................................. 2016-076153

(51) Int. Cl.
*C08F 10/02* (2006.01)
*C08F 10/00* (2006.01)
(Continued)

(52) U.S. Cl.
CPC ............. *C08F 10/02* (2013.01); *C08F 4/6592* (2013.01); *C08F 10/00* (2013.01); *C08G 79/10* (2013.01)

(58) Field of Classification Search
CPC ........ C08F 10/02; C08F 10/00; C08F 4/6592; C08G 79/10
(Continued)

(56) References Cited

U.S. PATENT DOCUMENTS 5,831,109 A * 11/1998 Smith .................... B01J 31/143
556/179
2011/0282017 A1  11/2011 Kaji et al.
2015/0057418 A1  2/2015 Kaji et al.

FOREIGN PATENT DOCUMENTS

JP    H09216908 A    8/1997
JP    200095810 A    4/2000
(Continued)

OTHER PUBLICATIONS

Extended European Search Report dated Dec. 9, 2019 in EP Application No. 17779144.9.
(Continued)

*Primary Examiner* — William K Cheung
(74) *Attorney, Agent, or Firm* — Panitch Schwarze Belisario & Nadel LLP

(57) ABSTRACT

A method for producing a high-activity solid PMAO composition is provided, involving: (a) heating an aromatic hydrocarbon solution of TMAL and PMAO containing units having formula (I), and precipitating a solid PMAO composition containing PMAO and TMAL; (b) adding an aromatic hydrocarbon solution of TMAL and PMAO containing units represented by formula (I) to a solution containing the solid PMAO composition; and (c) heating the resulting solution, thereby precipitating a solid PMAO composition. In steps (b) and (c), at least 70% of the PMAO and TMAL in terms of aluminum precipitates. The median diameter d2 of the solid PMAO composition produced in (c) is greater
(Continued)

than the median diameter d1 of the solid PMAO composition produced in (a).

$$-[(Me)AlO]_n- \qquad (I)$$

In formula (I), n represents an integer of 10-50. An olefin polymerization catalyst using the solid PMAO composition and a method for producing an olefin polymer using this catalyst are also described.

21 Claims, 2 Drawing Sheets

(51) Int. Cl.
*C08G 79/10* (2006.01)
*C08F 4/6592* (2006.01)

(58) Field of Classification Search
USPC .......................................................... 526/160
See application file for complete search history.

(56) References Cited

FOREIGN PATENT DOCUMENTS

| JP | 2001502714 A | 2/2001 |
|---|---|---|
| JP | 201637452 | 3/2016 |
| WO | 9818801 A1 | 5/1998 |
| WO | 2010055652 A1 | 5/2010 |
| WO | 2011142400 A1 | 11/2011 |
| WO | 2013146337 A1 | 10/2013 |
| WO | 2014123212 A1 | 8/2014 |

OTHER PUBLICATIONS

International Preliminary Report on Patentability dated Oct. 9, 2018 in International Application No. PCT/JP2017/014113.
International Search Report dated Jul. 4, 2017 in International Application No. PCT/JP2017/014113.
Office Action dated Jul. 2, 2020 in CN Application No. 201780021393.6 (with English Machine Translation).
Office Action dated May 27, 2020 in IN Application No. 201847041553.

* cited by examiner

SOLID PMAO COMPOSITION AND METHOD FOR PRODUCING SAME

CROSS-REFERENCE TO RELATED APPLICATION

This application is a Section 371 of International Application No. PCT/JP2017/014113, filed Apr. 4, 2017, which was published in the Japanese language on Oct. 12, 2017 under International Publication No. WO 2017/175766 A1, which claims priority under 35 U.S.C. § 119(b) to Japanese Application No. 2016-076153, filed Apr. 5, 2016, the disclosures of which are incorporated herein by reference in their entirety.

TECHNICAL FIELD

The present invention relates to a solid poly-methylaluminoxane composition (hereinafter sometimes referred to as "solid PMAO composition") suitable for polymerization of olefins, a polymerization catalyst using the solid PMAO composition as a co-catalyst, and a method for producing polyolefins.

In addition, the solid poly-methylaluminoxane composition using the conventionally known support is referred to as a supported solid poly-methylaluminoxane composition (supported solid PMAO composition).

CROSS-REFERENCE TO RELATED APPLICATION

This application claims the priority of Japanese Patent Application No. 2016-076153 filed on Apr. 5, 2016, the entire disclosure of which is incorporated herein by reference.

BACKGROUND ART

A liquid poly-aluminoxane composition is a condensation product generally prepared by a partial hydrolysis reaction of an organoaluminum compound. It is known that a liquid poly-aluminoxane compositions is useful as a co-catalyst component for efficiently activating a transition metal compound serving as a main catalyst in the production of olefin polymers. It is widely known that a poly-methylaluminoxane composition prepared using trimethylaluminum (hereinafter sometimes referred to as TMAL) as a raw material organoaluminum compound exhibits particularly excellent co-catalyst performance. This composition is usually handled in a solution state where the composition is dissolved in an aromatic hydrocarbon solvent such as toluene. This is sometimes referred to as a liquid poly-methylaluminoxane composition (liquid PMAO composition).

The poly-methylaluminoxane composition shows excellent co-catalyst performance. However, since the poly-methylaluminoxane composition is normally handled in a state where the composition is dissolved in a solvent together with a main catalyst such as a metallocene compound, the morphology control of the produced polymer cannot be performed. The resulting problems are that handling of the polymer becomes difficult, and that fouling due to polymer adhesion to a polymerization reactor and the like is very likely to occur.

In order to solve these problems, a method has been suggested for preparing a supported solid PMAO composition in which a poly-methylaluminoxane composition is supported on a solid inorganic support such as silica, alumina, magnesium chloride and the like and using the prepared composition in suspension polymerization or gas-phase polymerization. Among the solid inorganic supports, silica with controlled amount of surface hydroxyl groups is most widely used as a support, and there are many examples of industrial applications thereof. It is also suggested to use a polymer support such as polystyrene beads.

It is known that the silica support tends to remain in the polymer and becomes one of causes of fish eyes when a film is formed, which results in deterioration of polymer performance. It is also known that the supported solid PMAO composition using such a support exhibits a large decrease in activity when compared with the polymerization activity in homogeneous polymerization. Therefore, in order to solve the above problems, it is desirable to develop a solid PMAO composition with high activity comparable to that of homogeneous polymerization while maintaining the merit of the poly-methylaluminoxane composition as a co-catalyst being in a solid state.

The inventors of the present invention have suggested solid PMAO compositions which are in the form of comparatively fine particles with a volume-based median diameter in the range of 5 μm to 50 μm, include only poly-methylaluminoxane and do not use a support such as silica, and also suggested a method for efficiently preparing such compositions (PTL 1). The particle diameter of the obtained solid PMAO compositions is relatively uniform, and the compositions feature a polymerization activity in preparation of olefin polymers which is higher than that of a supported solid PMAO composition using a support. Depending on the polymerization conditions, the demonstrated activity may be comparable to that of liquid poly-methylaluminoxane compositions. That is, the solid PMAO composition disclosed in PTL 1 is a new solid co-catalyst having both high co-catalyst performance (activator) and a support function. Furthermore, a solid PMAO composition having a volume-based median diameter smaller than 5 μm, which is smaller than that of the solid PMAO composition disclosed in PTL 1, has been suggested together with a production method thereof (PTL 2). The solid PMAO composition disclosed in PTL 2 has high uniformity of particle size distribution, high polymerization activity in preparation of olefin polymers, and high ability to inhibit fouling of a reactor.

In the methods disclosed in PTL 1 and 2, the yield when preparing the solid PMAO composition from the liquid poly-methylaluminoxane composition is high, and it is not necessary to remove the solvent from the liquid poly-methylaluminoxane composition with a vacuum pump.

[PTL 1] WO 2010/055652
[PTL 2] WO 2013/146337

The entire disclosure of PTL 1 and 2 is hereby specifically incorporated by reference.

SUMMARY OF INVENTION

Technical Problem

Incidentally, in the preparation of olefin polymers, there is a need for a solid PMAO composition having a relatively large particle diameter, and among the solid PMAO compositions disclosed in PTL 1, the use of a composition having a relatively large particle diameter was investigated. Specifically, reaction characteristics of the solid PMAO composition disclosed in PTL 1 were investigated under reaction conditions for preparation of an olefin polymer requiring a solid PMAO composition having a relatively large particle diameter. As a result, it was found that, a solid PMAO composition having a comparatively large particle diameter, which showed good performance under the reaction conditions described in examples of PTL 1, did not exhibit sufficient performance when the reaction conditions were changed. The reaction conditions for preparing an olefin polymer requiring a solid PMAO composition having a relatively large particle diameter are strict conditions close to those used in an actual reaction process.

The inventors of the present invention found a new problem, namely, that it is required to create a solid PMAO composition having a relatively large particle diameter and exhibiting relatively high activity even under severe conditions used in the actual reaction process. It is an object of the present invention to provide a novel solid PMAO composition, to provide a catalyst for olefin polymerization using the novel solid PMAO composition, and to provide a method for producing an olefin polymer by using the catalyst, those composition, catalyst and method being capable of solving the aforementioned problem.

Solution to Problem

The inventors of the present invention conducted comprehensive research to solve the above-mentioned problem. In the process, it was found that in the preparation of a solid PMAO composition from a liquid poly-methylaluminoxane composition, a solid PMAO composition having a relatively large particle diameter which is obtained by preparing a solid PMAO composition having a relatively small particle diameter by precipitation, then additionally adding a liquid poly-methylaluminoxane composition, and then reheating has a relatively high activity and has a uniform particle size distribution required for a co-catalyst for olefin polymerization. The present invention was completed on the basis of this finding.

The present invention for solving the above problems is as follows.

[1]
A method for producing a solid PMAO composition, comprising:

(a) a step of heating an aromatic hydrocarbon solution (liquid PMAO composition A) containing a poly-methylaluminoxane containing a unit represented by a following general formula (I) (hereinafter sometimes referred to as PMAO) and trimethylaluminum (hereinafter sometimes referred to as TMAL) to precipitate a solid PMAO composition containing the PMAO and TMAL, a precipitation amount of the solid PMAO composition in the step (a) being 70% or more based on aluminum of the PMAO and TMAL contained in the liquid PMAO composition A;

(b) a step of adding an aromatic hydrocarbon solution (liquid PMAO composition B) containing a PMAO containing a unit represented by the following general formula (I) and TMAL to a solution containing the solid PMAO composition obtained in the step (a); and (c) a step of heating the solution obtained in the step (b) to precipitate a solid PMAO composition, a precipitation amount of the solid PMAO composition in the step (c) being 70% or more based on aluminum of the PMAO and TMAL contained in the liquid PMAO compositions A and B, wherein a median diameter d2 of the solid PMAO composition produced in the step (c) is larger than a median diameter d1 of the solid PMAO composition produced in the step (a), and a heating temperature in the step (c) is the same as or different from a heating temperature in the step (a).

[C1]

[(Me)AlO]$_n$— (I)

(In the formula, n represents an integer of 10 to 50.)

[2]
The production method according to [1], wherein a PMAO concentration of the liquid PMAO composition A is 5 mass % or more, and the liquid PMAO composition B is added such that a PMAO concentration in the solution obtained by adding the liquid PMAO composition B in the step (b) is 0.5 mass % or more.

[3]
The production method according to [1] or [2], wherein the median diameter d1 of the solid PMAO composition produced in the step (a) is in the range of 1 μm to 20 and the median diameter d2 of the solid PMAO composition produced in the step (c) is in the range of 8 μm to 70 μm.

[4]
The production method according to [1] or [2], wherein the step (b) and the step (c) are carried out one more time or more after step (c) by using the solution containing the solid PMAO composition obtained in step (c), the median diameter d3 of the solid PMAO composition produced in the second step (c) being larger than the median diameter d2 of the solid PMAO composition produced in the first step (c).

[5]
The production method according to [4], wherein the median diameter d1 of the solid PMAO composition produced in the step (a) is in the range of 1 μm to 20 μm; the median diameter d2 of the solid PMAO composition produced in the first step (c) is in the range of 5 μm to 35 μm; and the median diameter d3 of the solid PMAO composition produced in the second step (c) is in the range of 10 μm to 70 μm.

[6]
The production method according to any one of [1] to [5], wherein the liquid PMAO composition B used in the step (b) has an Al/O ratio larger than the Al/O ratio of the liquid PMAO composition A used in the step (a).

[7]
The production method according to any one of [1] to [6], wherein the solid PMAO composition comprises at least the PMAO and TMAL.

[8]
The production method according to any one of [1] to [7], wherein the solid PMAO composition is in a solid state at a temperature of 30° C. or less.

[9]
The production method according to any one of [1] to [8], wherein the solid PMAO composition has a circularity in the range of 0.5 to 1.

[10]
The production method according to any one of [1] to [9], wherein the solid PMAO composition has a polymerization activity of a catalyst of 10 kg-PE/g-cat·hr or more as measured in an ethylene slurry polymerization carried out under the following conditions as a bisindenylzirconium dichloride (BI)-supported solid PMAO catalyst having Al/Zr=200.

Ethylene slurry polymerization conditions:

Polymerization pressure: 0.8 MPa, polymerization temperature: 80±1° C., polymerization time: within 1 hr, solvent:hexane (BI-supported solid PMAO catalyst:solvent=18.1 mg:800 ml), scavenger: 0.5 mmol triethylaluminum, kg-PE in the polymerization activity units kg-PE/g-cat·hr is the mass of produced polyethylene, and g-cat is the mass of BI-supported solid PMAO catalyst.

[11]

A solid PMAO composition which comprises a polymethylaluminoxane containing a unit represented by a following general formula (I) (hereinafter sometimes referred to as PMAO) and trimethylaluminum (hereinafter sometimes referred to as TMAL), has a median diameter d within the range of 8 μm to 70 μm, and has a polymerization activity of a catalyst of 10 kg-PE/g-cat·hr or more as measured in an ethylene slurry polymerization carried out under the following conditions as a bisindenylzirconium dichloride (BI)-supported solid PMAO catalyst having Al/Zr=200.

Ethylene slurry polymerization conditions:

Polymerization pressure: 0.8 MPa, polymerization temperature: 80±1° C., polymerization time: within 1 hr, solvent:hexane (BI-supported solid PMAO catalyst:solvent=18.1 mg:800 ml), scavenger: 0.5 mmol triethylaluminum, kg-PE in the polymerization activity unit kg-PE/g-cat·hr is the mass of produced polyethylene, and g-cat is the mass of BI-supported solid PMAO catalyst.

[C2]

$$[(Me)AlO]_n— \quad (I)$$

(In the formula, n represents an integer of 10 to 50.)

[12]

The solid PMAO composition according to [11], wherein the solid PMAO composition is in a solid state at a temperature of 30° C. or less.

[13]

The solid PMAO composition according to [11] or [12], wherein the solid PMAO composition has a circularity in the range of 0.5 to 1.

[14]

The solid PMAO composition according to any one of [11] to [13], wherein an aluminum content is in the range of 38 mass % to 43 mass %.

[15]

The solid PMAO composition according to any one of [11] to [14], wherein a mole fraction Me (TMAL) of a methyl group derived from TMAL is 25 mol % or less.

[16]

A catalyst for polymerization of olefins, which comprises a solid PMAO composition according to any one of [11] to [15] and a transition metal compound represented by a following general formula (II) as catalyst components.

[C3]

$$MR^5R^6R^7R^8 \quad (II)$$

(In the formula, M represents a transition metal element, at least one of $R^5$, $R^6$, $R^7$ and $R^8$ is an organic group having a cycloalkadienyl skeleton, and the rest are independently an alkyl group, an alkoxy group, an aryloxy group, an alkylsilyl group, an alkylamido group, an alkylimido group, an alkylamino group, an alkylimino group, or a halogen atom. When two or more of $R^5$, $R^6$, $R^7$ and $R^8$ are each an organic group having a cycloalkadienyl skeleton, at least two of the organic groups having a cycloalkadienyl skeleton may be crosslinked by carbon, silicon or germanium.)

[17]

A catalyst for polymerization of olefins, which is a composite comprising a solid PMAO composition according to any one of [11] to [15], a transition metal compound represented by a following general formula (II), and an olefin prepolymer.

[C4]

$$MR^5R^6R^7R^8 \quad (II)$$

(In the formula, M represents a transition metal element, at least one of $R^5$, $R^6$, $R^7$ and $R^8$ is an organic group having a cycloalkadienyl skeleton, and the rest are independently an alkyl group, an alkoxy group, an aryloxy group, an alkylsilyl group, an alkylamido group, an alkylimido group, an alkylamino group, an alkylimino group, or a halogen atom. When two or more of $R^5$, $R^6$, $R^7$ and $R^8$ are each an organic group having a cycloalkadienyl skeleton, at least two of the organic groups having a cycloalkadienyl skeleton may be crosslinked by carbon, silicon or germanium.)

[18]

The polymerization catalyst according to [17], wherein the olefin prepolymer is an olefin homopolymer or copolymer.

[19]

The polymerization catalyst according to [18], wherein the olefin homopolymer is an ethylene homopolymer or a propylene homopolymer, and the olefin copolymer is a copolymer of ethylene and/or propylene and hexene-1 and/or octene-1.

[20]

The polymerization catalyst according to any one of [17] to [19], wherein a mass ratio (referred to as a degree of prepolymerization) of the olefin prepolymer to the total of the solid PMAO composition and the transition metal compound represented by the general formula (II) is in the range of 0.1 to 100.

[21]

A method for producing a polyolefin, which comprises polymerizing an olefin using the catalyst according to any one of [16] to [20].

Advantageous Effects of Invention

According to the present invention, it is possible to provide a solid PMAO composition having a high activity despite a comparatively large particle diameter even when used as a co-catalyst in olefin polymerization under severe conditions close to those used in an actual reaction process. Further, the solid PMAO composition of the present invention makes it possible to form a polyolefin with good morphology and polymer bulk density in olefin polymerization using this composition as a co-catalyst.

DESCRIPTION OF EMBODIMENTS

[Solid Poly-methylaluminoxane (PMAO) Composition]

Figure 1:
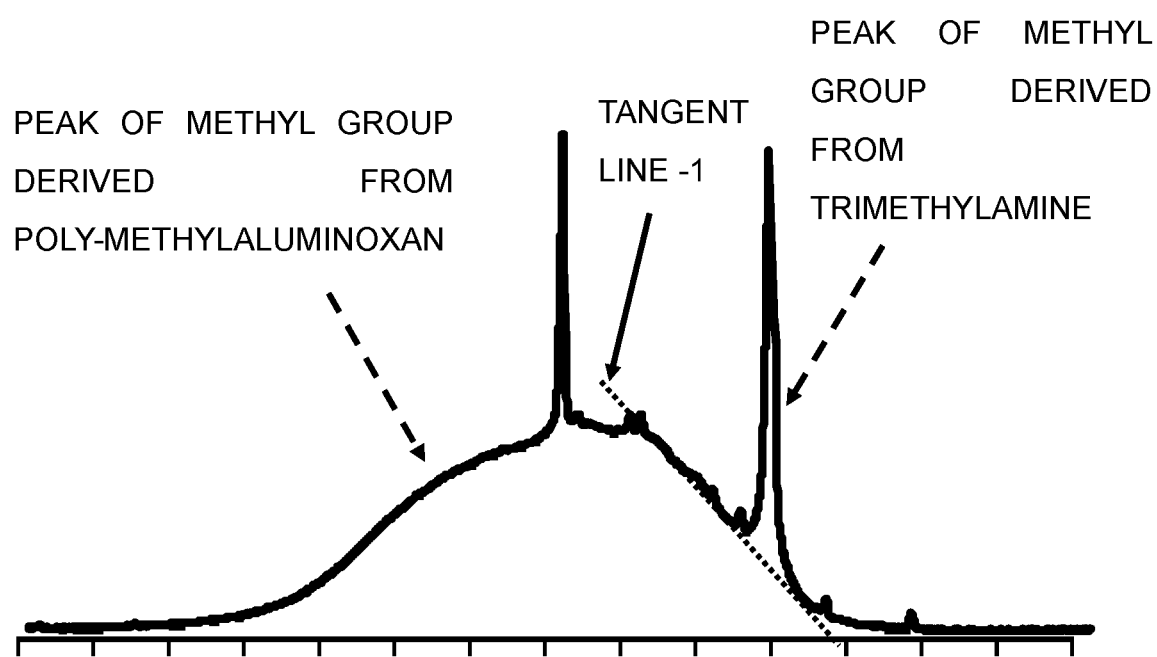
FIG. 1 is an $^1$H-NMR measurement result on a liquid MAO composition.
Figure 2:
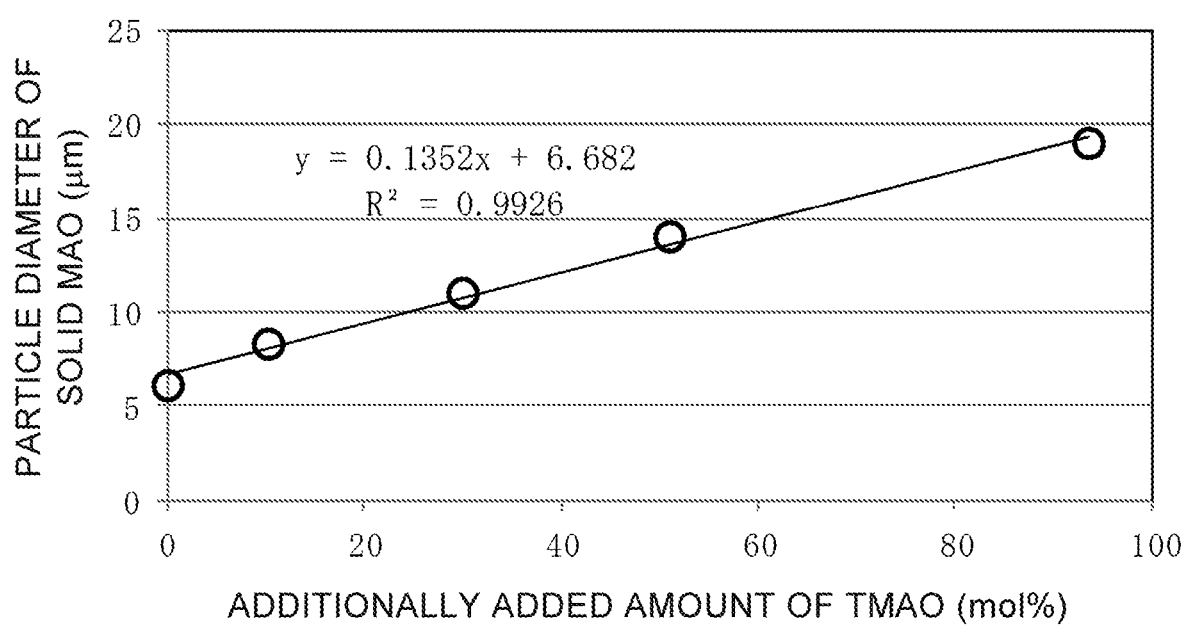
FIG. 2 depicts a relationship between the particle diameter of a solid PMAO composition and additional addition amount of TMAO. Plot of data as described in Reference Example 1 and Examples 1 to 4.

The solid PMAO composition of the present invention comprises at least a poly-methylaluminoxane (PMAO) and TMAL, and has a polymerization activity of a catalyst of 10 kg-PE/g-cat·hr or more as measured in an ethylene slurry polymerization carried out under the following conditions as a bisindenylzirconium dichloride (BI)-supported solid PMAO catalyst having Al/Zr=200.

The solid PMAO composition of the present invention preferably has a median diameter d in the range of 8 μm to 70 μm.

Ethylene slurry polymerization conditions:

Polymerization pressure: 0.8 MPa, polymerization temperature: 80±1° C., polymerization time: within 1 hr, solvent:hexane (BI-supported solid PMAO catalyst:solvent=18.1 mg:800 ml), scavenger: 0.5 mmol triethylaluminum, kg-PE in the polymerization activity units kg-PE/g-cat·hr is the mass of produced polyethylene, and g-cat is the mass of BI-supported solid PMAO catalyst. The polymerization time can be 1 hr or an appropriate interval within 1 hr, and in the case of less than 1 hr, the polymerization activity is calculated in terms of 1 hr.

The ethylene slurry polymerization method based on the ethylene slurry polymerization conditions is specifically described in (3)(b) of Example 1. In preparing the BI-supported solid PMAO catalyst used for this slurry polymerization, the catalyst is prepared by mixing a toluene dispersion of the solid PMAO composition (solid PMAO composition concentration: about 35 g/L) in an amount to give Al/Zr=200 (mol/mol) and a toluene solution of bis-indenyl zirconium dichloride (BI) (61 concentration: about 2.6 mmol/L). Although the BI-supported solid PMAO catalyst is sometimes evaluated as a toluene dispersion, it may be also evaluated after washing with hexane and the like. Specifically, see (3)(a) of Example 1.

The solid PMAO composition of the present invention is in a particulate form and can have a volume-based median diameter of, for example, 8 μm to 70 μm. When the volume-based median diameter of the solid PMAO composition of the present invention, which is in a particulate form, is within the above-mentioned range, by using the solid PMAO composition and a transition metal compound, it is possible to obtain an olefin polymer which maintains good bulk density of the polymer and in which generation of finely powdered polymer is suppressed. From the viewpoint of realizing good powder properties such as bulk density of the olefin polymer to be obtained, a good volume-based median diameter of the solid PMAO composition is generally considered to be about 5 μm to 200 μm. Considering the uniformity of particle diameter, the volume-based median diameter of the solid PMAO composition of the present invention is preferably within the range of 8 μm to 50 μm, more preferably 10 μm to 40 μm, and even more preferably 10 μm to 35 μm.

The volume-based median diameter and particle size distribution of the solid PMAO composition of the present invention can be determined by laser diffraction/scattering method under dry nitrogen atmosphere using Mastersizer 2000 Hydro S manufactured by Malvern Instrument Ltd. Specific methods are described in the examples.

With the solid PMAO composition of the present invention, although the median diameter d is relatively large, as indicated by the range of 8 μm to 70 μm hereinabove, the polymerization activity of the catalyst measured in the ethylene slurry polymerization carried out under the above conditions by using the composition as a bisindenylzirconium dichloride (BI)-supported solid PMAO catalyst (Al/Zr=200) is 10 kg-PE/g-cat·hr or more. The conditions of the ethylene slurry polymerization are relatively severe conditions close to those used in the actual reaction process as compared with the conditions used in the example disclosed in PTL 1. Nevertheless, the solid PMAO composition of the present invention has a polymerization activity measured for a BI-supported solid PMAO catalyst as high as 10 kg-PE/g-cat·hr or more.

The solid PMAO composition of the present invention preferably has a polymerization activity measured as BI-supported solid PMAO catalyst of 11 kg-PE/g-cat·hr or more, more preferably 12 kg-PE/g-cat·hr or more, even more preferably 13 kg-PE/g-cat·hr or more, and still more preferably 14 kg-PE/g-cat·hr or more. Although there is no upper limit to the polymerization activity, in practice, 30 kg-PE/g-cat·hr is a realistic value. However, this value is not intended to be limiting.

The PMAO contained in the solid PMAO composition of the present invention can contain, for example, a unit represented by the following general formula (I).

[C5]

$$[(Me)AlO]_n— \qquad (I)$$

(In the formula, Me represents a methyl group and n represents an integer of 10 to 50.)

Containing the unit represented by the general formula (I) means that a PMAO in which n is within the above range (n is a certain integer) or a plurality of PMAOs of different kinds (n is a plurality of different integers) is contained. The reason why n is an integer of 10 to 50 is that n of PMAO in the liquid PMAO composition as a raw material of the solid PMAO composition is 10 to 50.

It is indicated in certain literature that a PMAO chain length varies due to disproportionation between the PMAO chains in a liquid PMAO composition or between the PMAO chains and TMAL. However, no significant change in the TMAL content of the above disproportionation has so far been found by observation by $^1$H-NMR measurement of the liquid PMAO composition. From this, it is considered that n of PMAO in the solid PMAO composition almost corresponds to n of the liquid PMAO composition used as a raw material. The PMAO in the present invention may be a chain structure, a cyclic structure or a branched structure as long as the above unit is contained.

The solid PMAO composition of the present invention preferably has an aluminum content of the range of 38 mass % to 43 mass %. When the PMAO takes a cyclic structure, the theoretical amount of aluminum content is about 46 mass % to 47 mass % and the theoretical amount of aluminum content of TMAL is about 38 mass %. That is, in the case where the aluminum content of the solid PMAO composition exceeds 46 mass %, the solid PMAO composition is assumed to consist only of the PMAO having a cyclic structure, and it is assumed that there is hardly any TMAL and no impurities such as solvent and the like are contained. When the PMAO takes a linear structure, the theoretical amount of aluminum content varies depending on the number of n in the general formula (I), but it is smaller than that of the cyclic structure. Meanwhile, the solid PMAO composition of the present invention may include a PMAO having a linear structure and a branched structure in addition to a cyclic PMAO, and it is also possible that impurities such as residual solvent be included in a certain amount in addition to TMAL. Therefore, in the solid PMAO composition of the present invention, the aluminum content is preferably in the range of 38 mass % to 43 mass %. The smaller the aluminum content, the higher the proportion of TMAL present, and the larger the aluminum content, the lower the proportion of TMAL present.

When the aluminum content is in the range of 38 mass % to 43 mass %, the solid PMAO composition has good uniformity of particle diameter and rigidity such that crushing due to cracking and the like does not easily occur. Conversely, when the aluminum content of the present invention is less than 38 mass %, drying tends to be insufficient and impurities such as solvent are likely to be present in a large amount. When the aluminum content exceeds 43 mass %, it is assumed, as described hereinabove, that the composition is composed of a PMAO mainly having a cyclic structure and contains no TMAL or solvent impurities. In such a case, the performance as a co-catalyst obtained in the solid PMAO composition of the present invention is unlikely to be demonstrated. From the above viewpoint, the aluminum content is preferably in the range of 38 mass % to 43 mass %, more preferably 40 mass % to 43.0 mass %, and even more preferably 40.5 mass % to 42.5 mass %.

The aluminum content of the liquid PMAO composition and the solid PMAO composition used or prepared in the present invention can be determined, for example, by adding an excess amount of disodium ethylenediaminetetraacetate to a solution hydrolyzed with a 0.5 N sulfuric acid aqueous solution, and then performing titration with zinc sulfate using dithizone as an indicator. When the measured concentration is dilute, measurement can also be performed using atomic absorption spectrometry. The method of drying the solid PMAO composition to be used for measuring the present aluminum content will be described separately.

The solid PMAO composition of the present invention comprises a PMAO and TMAL. TMAL contained in the solid PMAO composition of the present invention is a substance inherently present as an unreacted raw material. The total number of moles of methyl groups contained in the solid PMAO composition of the present invention is the sum of the number of moles of methyl groups derived from TMAL and the number of moles of methyl groups derived from the PMAO. When the mole fraction of TMAL is represented as Me (TMAL) and the mole fraction of the PMAO is represented as Me (PMAO), the sum Me (TMAL)+Me (PMAO) is 100%. The mole fraction Me (TMAL) of methyl groups derived from TMAL is, for example, 25 mol % or less.

A low Me (TMAL) means that there are few methyl groups derived from the TMAL moiety contained in the PMAO composition and that the state of aluminum of the PMAO chain is large. When Me (TMAL) is 25 mol % or less, a solid PMAO composition is obtained which has low solvent solubility and strength such that particles are not broken even by drying treatment. Conversely, when Me (TMAL) exceeds 25 mol %, solvent solubility increases and particles tend to be easily crushed.

Me (TMAL) in the solid PMAO composition of the present invention is preferably 20 mol % or less, more preferably 17 mol % or less, and even preferably 15 mol % or less. The lower limit of Me (TMAL) may be, for example, 6 mol %, preferably 8 mol %, because it depends on a liquid PMAO composition which is a shape-controllable raw material of the solid PMAO composition.

The mole fraction of each component contained in the liquid PMAO composition and the solid PMAO composition can be determined from the area ratio attributed to each contained component by $^1$H-NMR measurement using a dissolved portion of the PMAO composition (liquid or solid) in a heavy solvent. A method for determining specific mole fractions Me (PMAO) and Me (TMAL) of the PMAO composition are described in the examples.

The solid PMAO composition of the present invention does not include a solid support. The solid PMAO composition of the present invention is not intended to include a solid support such as silica at least during the production process. Since the solid PMAO composition of the present invention does not include a support such as silica, drawbacks of solid PMAO compositions including a support such as silica can be avoided.

The solid PMAO composition of the present invention is in a solid state at a normal temperature (for example, 5° C. to 40° C.), and is in a solid state at a temperature of at least 30° C. or less. Solid state means a state that substantially does not have fluidity.

When polymerization evaluation is carried out using the solid PMAO composition of the present invention, preferable properties of the obtained polymer are obtained. In slurry polymerization, gas-phase polymerization and bulk polymerization, a bulk density (BD) of the obtained polymer is preferably 0.3 g/cc or more, more preferably 0.32 g/cc or more, and even more preferably 0.34 g/cc or more. The higher the BD, the more advantageously the productivity of the polymerization reaction can be enhanced. There is no upper limit to BD, but in reality it is, for example, 0.5 g/cc or less, or 0.45 g/cc or less.

The solid PMAO composition of the present invention preferably has a circularity in the range of 0.5 to 1, more preferably in the range of 0.6 to 0.9, and even more preferably in the range of 0.6 to 0.85. Generally, a polymer formed with a catalyst using solid MAO is formed reflecting the particle shape of solid MAO (replica shape). Therefore, in application to gas polymerization, it is preferable that the solid MAO be close to a sphere to ensure good flowability. Also in the solid PMAO composition of the present invention, where the circularity is 0.5 or more, the shape becomes close to spherical and can be favorably applied to gas polymerization.

Circularity Factor

Circularity is one of the shape indices related to the projected image of particles, and the circularity of Wadell (sphericity, how close the shape is to a circle) is obtained by the following formula.

$$\Psi\omega = \frac{\text{Circumference of circle having area equal to projected area of particle}}{\text{Circumference of actual particle}} \quad [\text{Math. 1}]$$

In the examples, since analysis is performed from a SEM image (two-dimensional information), the following equation is used.

$$\Psi\omega = \frac{4\pi \times \text{Area}}{(\text{Circumference})^2}, \Psi\omega < 1 \quad [\text{Math. 2}]$$

The SEM image is two-dimensional information, but since the orientation of particles on the measurement table is random, it is considered that in the case of measuring a certain number of particles, the image may be understood to represent the shape of a solid body (here, the degree of sphericity). Further, it is considered that the larger the number of particles used for analysis, the smaller the error of the analysis result becomes. However, in consideration of the analysis time, the measurement in examples was carried out on 300 particles. Based on the particle size distribution obtained by a laser diffraction type particle size distribution measuring device (Mastersizer), it is clear that the solid PMAO composition of the present invention has high particle homogeneity. Therefore, the abovementioned number of particles can be considered to be sufficient. The analysis to find the circularity can be performed by using, for example, image analysis type particle size distribution measurement software Mac-View (ver. 4) and the like.

[Method for Producing Solid PMAO Composition]

A method for producing the solid PMAO composition of the present invention comprises:

(a) a step of heating an aromatic hydrocarbon solution (liquid PMAO composition A) containing a PMAO containing a unit represented by a following general formula (I) and TMAL to precipitate a solid PMAO composition containing the PMAO and TMAL, a precipitation amount of the solid PMAO composition in the step (a) being 70% or more based on aluminum of the PMAO and TMAL contained in the liquid PMAO composition A;

(b) a step of adding an aromatic hydrocarbon solution (liquid PMAO composition B) containing PMAO containing a unit represented by the following general formula (I) and TMAL to a solution containing the solid PMAO composition obtained in the step (a); and (c) a step of heating the solution obtained in the step (b) to precipitate a solid PMAO composition, a precipitation amount of the solid PMAO composition in the step (b) being 70% or more based on aluminum of the PMAO and TMAL contained in the liquid PMAO composition B, wherein a median diameter d2 of the solid PMAO composition produced in the step (c) is larger than a median diameter d1 of the solid PMAO composition produced in the step (a), and a heating temperature in the step (c) is the same as or different from a heating temperature in the step (a).

[C6]

$$[(Me)AlO]_n— \quad (I)$$

(In the formula, Me is a methyl group and n represents an integer of 10 to 50.)

Containing the unit represented by the general formula (I) means that a PMAO in which n is within the above range (n is a certain integer) or a plurality of PMAOs of different kinds (n is a plurality of different integers) is contained. The reason why n is an integer from 10 to 50 is that the degree of polymerization of aluminoxane based on the molecular weight determined from the solidifying point decrease in benzene is present in the range of 10 to 50.

<Liquid PMAO Composition>

The liquid PMAO composition used as a raw material in the production method of the present invention can be prepared, for example, by a method disclosed in Japanese Translation of PCT Application No. 2000-505785 (WO 97/23288) (the entire disclosure of which is incorporated herein by reference). The method disclosed in this patent literature is a method for preparing a liquid PMAO composition without partial hydrolysis of TMAL. More specifically, it is a method for obtaining a liquid PMAO composition by thermally decomposing an alkylaluminum compound having an aluminum-oxygen-carbon bond formed by using an aldehyde compound or a ketone compound as an oxygen source. It is also possible to use a liquid PMAO composition prepared by adding an oxygen-containing compound such as a carboxylic acid for the purpose of reducing the amount of TMAL remaining in the liquid PMAO composition obtained by partially hydrolyzing TMAL.

Examples of the aromatic hydrocarbon suitable for the liquid PMAO composition include benzene, toluene, ethylbenzene, propylbenzene, butylbenzene, xylene, chlorobenzene, dichlorobenzene, and the like. However, these examples are not limiting, and any aromatic hydrocarbons can be used as a solvent for a liquid PMAO composition.

Further, the alkylaluminum compound having an aluminum-oxygen-carbon bond is preferably prepared by the reaction of TMAL and an oxygen-containing organic compound. Further, it is preferable that the oxygen-containing organic compound be an aliphatic or aromatic carboxylic acid represented by a general formula (III).

[C7]

$$R^1—(COOH)_n \quad (III)$$

(In the formula, $R^1$ represents a C1 to C20 linear or branched hydrocarbon group such as an alkyl group, an alkenyl group, or an aryl group, and n represents an integer of 1 to 5.)

The oxygen-containing compound used for the reaction of TMAL and the oxygen-containing compound producing an alkylaluminum compound having an aluminum-oxygen-carbon bond which gives a liquid PMAO composition by thermal decomposition reaction is, for example, a carboxylic acid compound having a COOH group and a carboxylic acid anhydride. In preparing the liquid PMAO composition, these compounds can be used singly or in a plurality thereof. Specific examples of the oxygen-containing compound include formic acid, acetic acid, propionic acid, n-butyric acid, n-valeric acid, n-caproic acid, n-enanthic acid, n-caprylic acid, n-pelargonic acid, n-capric acid, n-lauric acid, n-myristic acid, n-stearic acid, oxalic acid, malonic acid, succinic acid, glutaric acid, adipic acid, pimelic acid, suberic acid, azelaic acid, sebacic acid, benzoic acid, phthalic acid, citric acid, tartaric acid, lactic acid, malic acid, toluic acid, toluic anhydride, acetic anhydride, propionic anhydride, n-butyric acid anhydride, n-valeric acid anhydride, n-caproic acid anhydride, oxalic anhydride, malonic anhydride, succinic anhydride, glutaric anhydride, benzoic anhydride, phthalic anhydride, and the like. Among these, preferred are acetic acid, acetic anhydride, propionic acid, propionic anhydride, benzoic acid, benzoic anhydride, phthalic acid, phthalic anhydride, toluic acid, and toluic anhydride.

The molar ratio of aluminum atoms contained in TMAL and oxygen atoms of the oxygen-containing organic compound used for the synthesis of the liquid PMAO composition can be arbitrarily set for the purpose of controlling the molecular weight of PMAO and the residual amount of TMAL. The ratio (Al/O molar ratio) of molar amounts of aluminum atoms contained in TMAL to oxygen atoms of the oxygen-containing organic compound can be arbitrarily set, for example, in the range of (0.5 to 3.0):1. From the viewpoint of ease of preparation of the liquid PMAO composition, stability thereof and control of an appropriate residual TMAL amount, the molar ratio is preferably in the range of (1.0 to 1.70):1, more preferably in the range of (1.10 to 1.40):1, even more preferably in the range of (1.10 to 1.30):1, still more preferably in the range of (1.15 to 1.25), and even more preferably in the range of (1.15 to 1.20):1.

The synthesis can be carried out with the thermal decomposition temperature of the aluminum compound having an aluminum-oxygen-carbon bond, which is a precursor of the liquid PMAO composition, having any value between 20° C. and 100° C. From the viewpoints of ease of carrying out the reaction, safety and appropriate reaction time, the thermal decomposition temperature is preferably from 30° C. to 80° C., and more preferably from 60° C. to 80° C. The thermal decomposition time of the aluminum compound having an aluminum-oxygen-carbon bond varies depending on the thermal decomposition temperature, the composition of raw materials (for example, Al/O molar ratio, concentration, and the like), but is, for example, in the range of 5 hr to 100 hr. Where the temperature is low, longer time is needed, and where the temperature is high, it is possible to finish the thermal decomposition in a short time.

When the thermal decomposition temperature exceeds 100° C., reaction control sometimes becomes impossible due to heat of thermal decomposition reaction, which may lead to remarkable formation of an amorphous gel-like product, the liquid viscosity of the PMAO solution increases and the solution can become heterogeneous. Meanwhile, where the thermal decomposition temperature is lower than 50° C., remarkable decrease in productivity occurs in some cases due to an increase in PMAO generation reaction time.

In the present invention, it is important to control the temperature during preparation of the liquid PMAO composition used as a raw material. At first sight, the present invention can be understood as being partially included in the preparation step of the liquid PMAO composition. However, when attempting to obtain a solid PMAO composition with controlled particle diameter, firstly, a liquid PMAO composition is prepared by thermally decomposing an alkylaluminum compound having an aluminum-oxygen-carbon bond, which is a raw material for a liquid PMAO composition, and then a solid PMAO composition is obtained through steps (a) to (c). That is, an alkylaluminum compound having an aluminum-oxygen-carbon bond is thermally decomposed to prepare a liquid PMAO composition, and the prepared liquid PMAO composition is used in steps (a) to (c) to form a solid PMAO composition.

Where the PMAO concentration in an inert hydrocarbon solvent prepared by thermally decomposing an alkylaluminum compound having an aluminum-oxygen-carbon bond, which is a raw material for a liquid PMAO composition, is expressed by Al concentration in the solution, the concentration may be in the range of 1 mass % to 15 mass %, preferably in the range of 3 mass % to 12 mass %, and more preferably in the range of 6 mass % to 10 mass %. Where the concentration of PMAO (or Al concentration in the solution) is low, thermal decomposition requires a long time, and where the concentration is high, thermal decomposition can be completed in a short time. The concentration can be adjusted in consideration of the control conditions of heat of reaction.

In most of the literature relating to methods for obtaining a liquid PMAO composition by thermal decomposition reaction of an aluminum compound having an aluminum-oxygen-carbon bond, emphasis is placed on obtaining a liquid PMAO composition with a quantitative reaction yield and enabling the control of TMAL amount in the liquid PMAO composition. In general, since TMAL does not act as an activator for transition metal compounds including metallocene compounds, it is an important task to control the amount of TMAL remaining in the liquid PMAO composition. Meanwhile, it is well known that when a liquid PMAO composition is prepared by a hydrolysis method, unless the aluminum concentration in the reaction solution is lowered and the amount of water added to the raw material TMAL is kept low, the aluminum recovery rate greatly decreases, and the remaining amount of TMAL is higher than that obtained by thermal decomposition reaction.

From the viewpoint of increasing the yield of solid PMAO, it is preferable that the mole fraction (Me (TMAL)) of the methyl groups derived from the TMAL moiety in the total number of moles of the methyl groups in the liquid PMAO composition used as a raw material be 25 mol % or less. Me (TMAL) is preferably 20 mol % or less, more preferably 17 mol % or less, and even more preferably 15 mol % or less. The lower limit of Me (TMAL) is approximately 6 mol %. Me (TMAL) of the liquid PMAO composition prepared by the hydrolysis method is 40 mol % to 50 mol %, and it is difficult to reduce Me (TMAL) in the PMAO composition to less than 17 mol % by usual concentration and dry solidification treatment. Meanwhile, in the preparation of a liquid PMAO composition by the pyrolysis method, by setting the molar ratio of aluminum atoms contained in TMAL to the oxygen atoms of the oxygen-containing organic compound to 1.15, it is possible to set the lower limit of Me (TMAL) to about 8 mol %, and the obtained solid PMAO composition demonstrates good performance. For the above reasons, Me (TMAL) is preferably 6 mol % to 25 mol %, and more preferably 6 mol % to 20 mol %.

The liquid PMAO used in the present invention may be prepared by adding an aliphatic or aromatic carboxylic acid represented by the general formula (III) in a plurality of portions.

[C8]

$$R^1-(COOH)_n \quad \quad (III)$$

(In the formula, $R^1$ represents a C1 to C20 linear or branched hydrocarbon group such as an alkyl group, an alkenyl group, or an aryl group, and n represents an integer of 1 to 5.)

That is, a liquid PMAO obtained by further adding an aliphatic or aromatic carboxylic acid represented by the general formula (III) and performing heat treatment can also be used for the purpose of adjusting the molecular weight and the TMAL amount of the once formed liquid PMAO composition.

The aromatic hydrocarbon used in the solid PMAO production method of the present invention is not particularly limited, and examples thereof include benzene, toluene, ethylbenzene, propylbenzene, butylbenzene, xylene, chlorobenzene, dichlorobenzene and mixed solvents thereof. In order to form the solid PMAO after preparation of the liquid PMAO composition, heat treatment may be performed in the solvent as it is, or another solvent may be added and heat treatment may be performed in the mixed solvent system.

<Step (a)>

In the step (a), the liquid PMAO composition A is heated to precipitate a solid PMAO composition containing PMAO and TMAL. The liquid PMAO composition A is an aromatic hydrocarbon solution containing PMAO and TMAL. In the step (a), the heating is carried out until 70% or more, based on aluminum of PMAO and TMAL contained in the liquid PMAO composition A, is precipitated. The heating condition in the step (a) is such that the liquid PMAO composition A is heated at a temperature in a range from room temperature to 200° C. or less, preferably 150° C. or less, more preferably from 80° C. to 140° C., and still more preferably from 100° C. to 140° C. to precipitate the solid PMAO composition. The heating time can be appropriately determined in consideration of the precipitation rate of the solid PMAO composition, and is, for example, in the range of 1 hr to 24 hr. However, this range is not intended to be limiting. Further, the heating temperature can be changed during heating, and the time for maintaining each set temperature can be appropriately determined in consideration of the precipitation rate of the solid PMAO composition in the same manner as described above.

The precipitation rate of the solid PMAO composition is defined as (1−L)*100/K (percentage %), where (K wt %-Al) stands for Al concentration in the liquid PMAO composition and (L wt %-Al) stands for Al concentration in the supernatant at the end of precipitation of the solid PMAO composition. Therefore, where the Al concentration in the supernatant does not change despite the heating, the precipitation rate is 0%, and where the Al concentration of the supernatant after heating is 0 wt %, the precipitation rate is 100%. When determining the precipitation ratio of the solid PMAO composition in the case where a liquid PMAO composition is additionally added and subsequent heat treatment is performed, the amount of Al contained in the entire liquid PMAO composition used needs to be taken into account, but the basic approach is the same.

The supernatant can be drained or a solvent such as toluene can be added before the additional addition of the liquid PMAO composition. In the case where the supernatant is drained, the amount of Al in the extracted supernatant is taken into account when calculating the precipitation rate. Further, in the case where toluene is added, change in concentration due to this addition is taken into account when calculating the precipitation rate.

The heating in the step (a) is preferably carried out until precipitation of 70% or more, more preferably until precipitation of 90% or more, and even more preferably until precipitation of 95% or more based on aluminum of PMAO and TMAL contained in the liquid PMAO composition A. As the precipitation amount of PMAO and TMAL contained in the liquid PMAO composition A increases and as the amount of PMAO and TMAL remaining in the solution decreases, the degree of freedom with respect to the concentration of PMAO and TMAL in the liquid PMAO composition B to be used in the step (b) becomes high and the setting of the conditions in the step (b) tends to be facilitated.

<Step (b)>

Then, in the step (b), the liquid PMAO composition B is additionally added to the solution containing the solid PMAO composition precipitated in the step (a). The liquid PMAO compositions A and B used in the solid PMAO production method of the present invention may have the same composition or different compositions (for example, different Al/O ratios and different Al concentrations). The reaction conditions in the step (a) and the steps (b) and (c) can be appropriately determined according to the desired product.

The liquid PMAO composition B additionally added in the step (b) may have the same Al/O ratio as that of the liquid PMAO composition A introduced in the step (a), an Al/O ratio smaller than that of the liquid PMAO composition A, or an Al/O ratio larger than that of the liquid PMAO composition A. It is preferable to use the liquid PMAO composition B adjusted to an Al/O ratio larger than the Al/O ratio of the liquid PMAO composition A used in the step (a), because a high-performance solid PMAO composition can be obtained. This is specifically exemplified in the examples.

The amount of the liquid PMAO composition B can be prepared arbitrarily in the range of 0.1 mol % to 600 mol %, based on the amount of Al of the liquid PMAO composition to be introduced for preparing the solid PMAO composition, depending on the particle diameter to be prepared. This amount is preferably in the range of 0.1 mol % to 500 mol %, more preferably in the range of 0.1 mol % to 450 mol %, even more preferably in the range of 0.1 mol % to 400 mol %, still more preferably in the range of 0.1 mol % to 300 mol %, and even more preferably in the range of 0.1 mol % to 200 mol %.

The liquid PMAO composition B is introduced into the prepared solid PMAO composition prepared in the step (a), and the introduction method may be stepwise or continuous. The term "stepwise" means that a method of adding the liquid PMAO composition B to the prepared solid PMAO composition (slurry) and forming additional solid PMAO composition by heat treatment is repeatedly carried out in the form corresponding to the purpose such as particle diameter. The term "continuous" means a method of continuously adding the liquid PMAO composition to the prepared solid PMAO composition (slurry) at temperature at which the former is solidified and forming additional solid PMAO composition by heat treatment. The amount of the continuously added liquid PMAO composition is arbitrarily adjusted according to the desired particle diameter and the like.

The temperature at which the liquid PMAO composition B is additionally added may be from room temperature to 200° C., preferably from room temperature to 150° C., and more preferably from 40° C. to 140° C. When the temperature of additional addition is 80° C. or more, solidification may be started simultaneously with the additional addition.

<Step (c)>

In the step (c), the solution obtained in the step (b) is heated to precipitate a solid PMAO composition. In the step (c), the solid PMAO composition is further precipitated by heating at the same temperature as in step (a) or at a different temperature. After the additional addition of the liquid PMAO composition B, the solid PMAO composition is precipitated by heating preferably in the range of 80° C. to 140° C., more preferably in the range of 90° C. to 140° C.

The solidification in the step (c) can be carried out by directly subjecting the reaction solution obtained by adding the liquid PMAO composition B in the step (b) to a heat treatment. Alternatively, the heat treatment can be also performed after adding an aromatic hydrocarbon solvent such as toluene to the reaction solution obtained by adding the liquid PMAO composition B in the step (b), or after draining the supernatant from the reaction solution and changing the Al concentration. Specifically, it is preferable to carry out the heat treatment after decreasing the Al concentration by adding an aromatic hydrocarbon solvent such as toluene. This is specifically exemplified in the examples.

The median diameter d2 of the solid PMAO composition produced in the step (c) is larger than the median diameter d1 of the solid PMAO composition produced in the step (a). Preferably, the median diameter d1 of the solid PMAO composition produced in the step (a) is in the range of 1 μm to 20 μm, and the median diameter d2 of the solid PMAO composition produced in the step (c) is in the range of 8 μm to 70 μm. More preferably, the median diameter d1 of the solid PMAO composition produced in the step (a) is in the range of 3 μm to 15 μm, and the median diameter d2 of the solid PMAO composition produced in the step (c) in the range of 8 μm to 50 μm. Even more preferably, the median diameter d1 of the solid PMAO composition produced in the step (a) is in the range of 4 μm to 10 μm, and the median diameter d2 of the solid PMAO composition produced in the step (c) is in the range of 8 µm to 30 µm. The median diameter d2 of the solid PMAO composition produced in the step (c) is more preferably in the range of 10 µm to 30 µm.

In the precipitation in the step (c), there are both particle growth of the solid PMAO composition precipitated in the step (a) and precipitation of new particles. When the solid PMAO composition precipitated in the step (a) has a certain concentration of particles in the solution, the particle growth tends to occur preferentially. In the production method of the present invention, the steps (b) and (c) are carried out in order to increase further the size of particles of the solid PMAO composition produced in the step (a). For this reason, it is preferable to implement the production method under conditions such that particle growth preferentially occurs, and the concentration of the solid PMAO composition precipitated in the step (a) in the solution is, for example, 0.1 mass % to 10 mass %, and more preferably 0.5 mass % to 9.5 mass %.

It is preferable to set the conditions under which the particle growth of the solid PMAO composition occurs preferentially in the step (c). From the viewpoint of realizing such conditions, the concentration of PMAO in the liquid PMAO composition A in the step (a) is 5 mass % or more, and preferably 6 mass % to 10 mass %, and the liquid PMAO composition B is added so that the concentration of PMAO in the solution to which the liquid PMAO composition B is added in the step (b) becomes 0.5 mass % or more, preferably 0.5 mass % to 6 mass %.

The heating time can be appropriately determined in consideration of the precipitation rate of the solid PMAO composition, in the same manner as in the step (a). For example, the heating time is in the range of 1 hr to 24 hr. However, this range is not intended to be limiting. Further, the heating temperature can be changed during heating, and the time for maintaining each set temperature can be appropriately determined in consideration of the precipitation rate of the solid PMAO composition in the same manner as described above.

In the case of preparing a solid PMAO composition by additionally adding a liquid PMAO composition, it is also possible to remove the slurry solvent of the solid PMAO composition precipitated at the beginning or to add a solvent. The solvent to be added may be toluene and a similar aromatic solvent same as in the liquid PMAO composition, and a small amount of an aliphatic hydrocarbon and the like may be added for the purpose of changing the polarity of the reaction system. Here, it is important that the solvent have no reactivity with the liquid PMAO composition and the solid PMAO composition.

The heat treatment in the step (c) is carried out until 70% or more, based on aluminum of PMAO and TMAL which are contained in the liquid PMAO compositions A and B, is precipitated. The precipitation rate of the solid PMAO composition can be determined by the above method. In the step (c), from the viewpoint of production efficiency of the solid PMAO composition, the precipitation is preferably performed until 80% or more, more preferably 90% or more, and even more preferably 95% or more, based on aluminum of PMAO and TMAL which are contained in the liquid PMAO compositions A and B, is precipitated.

In the production method of the present invention, after the step (c), the step (b) and the step (c) can be further carried out one or more times by using the solution containing the solid PMAO composition obtained in the step (c). However, in this case, the median diameter d3 of the solid PMAO composition produced in the second step (c) is larger than the median diameter d2 of the solid PMAO composition produced in the first step (c).

Preferably, the median diameter d1 of the solid PMAO composition produced in the step (a) is in the range of 1 µm to 20 µm, the median diameter d2 of the solid PMAO composition produced in the first step (c) is in the range of 5 µm to 35 and the median diameter d3 of the solid PMAO composition produced in the second step (c) is in the range of 10 µm to 70 More preferably, the median diameter d1 of the solid PMAO composition produced in the step (a) is in the range of 3 µm to 15 µm, the median diameter d2 of the solid PMAO composition produced in the first step (c) is in the range of 6 µm to 30 µm, and the median diameter d3 of the solid PMAO composition produced in the second step (c) is in the range of 10 µm to 50 µm. Even more preferably, the median diameter d1 of the solid PMAO composition produced in the step (a) is in the range of 4 µm to 10 µm, the median diameter d2 of the solid PMAO composition produced in the first step (c) is in the range of 8 µm to 30 µm, and the median diameter d3 of the solid PMAO composition produced in the second step (c) is in the range of 10 µm to 40 µm. However, in either case d1<d2<d3.

In the step (c), a solid PMAO composition is obtained. This solid PMAO composition is the aforementioned solid PMAO composition of the present invention. The solid PMAO composition obtained in the step (c) can be used as it is, after washing with a solvent such as toluene or hexane, or after removing a solvent as a raw material for a polymerization catalyst for olefins.

[Polymerization Catalyst for Olefins]

The present invention is inclusive of a polymerization catalyst for olefins. The polymerization catalyst for olefins of the present invention is (1) a catalyst (referred to hereinbelow as catalyst A) comprising the solid PMAO composition of the present invention and a transition metal compound represented by the following general formula (II) as catalyst components, and (2) a catalyst (referred to hereinbelow as catalyst B) which is a composite comprising the solid PMAO composition of the present invention, a transition metal compound represented by the following general formula (II), and an olefin prepolymer. The catalyst B is a composite further obtained by further including an olefin prepolymer in the catalyst A.

[C9]

$$MR^5R^6R^7R^8 \qquad (II)$$

(In the formula, M represents a transition metal element, at least one of $R^5$, $R^6$, $R^7$ and $R^8$ is an organic group having a cycloalkadienyl skeleton, and the rest are independently an alkyl group, an alkoxy group, an aryloxy group, an alkylsilyl group, an alkylamido group, an alkylimido group, an alkylamino group, an alkylimino group, or a halogen atom. When two or more of $R^5$, $R^6$, $R^7$ and $R^8$ are each an organic group having a cycloalkadienyl skeleton, at least two of the organic groups having a cycloalkadienyl skeleton may be crosslinked by carbon, silicon or germanium.)

The transition metal compound represented by the general formula (II) is a catalyst known as a catalyst for olefin polymerization.

Specific examples of M in the general formula (II) are titanium, zirconium, hafnium, chromium, vanadium, manganese, iron, cobalt, nickel and palladium, preferably titanium, zirconium, chromium, iron, and nickel.

In the above general formula (II), a preferred transition metal compound is a metallocene compound coordinated with one or two ligands having a cycloalkadienyl skeleton. Examples of the ligand having a cycloalkadienyl skeleton include alkyl-substituted cyclopentadienyl groups such as a cyclopentadienyl group, a methylcyciopentadienyl group, an ethylcyclopentadienyl group, a butylcyclopentadienyl group, a dimethylcyclopentadienyl group, and a pentamethylcyclopentadienyl group, an indenyl group, a fluorenyl group and the like. The cycloalkadienyl groups may be crosslinked with a divalent substituted alkylene group, substituted silylene group and the like.

The ligand other than the ligand having a cycloalkadienyl skeleton is a hydrocarbon group having 1 to 20 carbon atoms, an alkoxy group, an aryloxy group, an alkylsilyl group, an amino group, an imino group, a halogen atom or a hydrogen atom. Examples of the hydrocarbon group having 1 to 20 carbon atoms include an alkyl group, a cycloalkyl group, an aryl group, an aralkyl group and the like. Specific examples of the alkyl group include a methyl group, an ethyl group, a propyl group, an isopropyl group, a butyl group, and the like. Examples of the cycloalkyl group include a cyclopentyl group, a cyclohexyl group and the like. Examples of the aryl group include a phenyl group, a tolyl group and the like, and examples of the aralkyl group include a benzyl group and the like. The alkoxy group is exemplified by a methoxy group, an ethoxy group, a butoxy group and the like, and the aryloxy group is exemplified by a phenoxy group and the like. These groups may be substituted with a halogen atom and the like. The alkylsilyl group is exemplified by a trimethylsilyl group, a triethylsilyl group and the like. Examples of the halogen include fluorine, chlorine, bromine and iodine.

Specific examples of the transition metal compound including a ligand having a cycloalkadienyl skeleton in the case where M in the general formula (II) is zirconium are presented hereinbelow. Bis(cyclopentadienyl)zirconium monochloride monohydride, bis(cyclopentadienyl)zirconium monobromide monohydride, bis(cyclopentadienyl) methyl zirconium hydride, bis(cyclopentadienyl) ethyl zirconium hydride, bis(cyclopentadienyl) phenyl zirconium hydride, bis(cyclopentadienyl) benzyl zirconium hydride, bis(cyclopentadienyl) neopentyl zirconium hydride, bis(methylcyclopentadienyl)zirconium monochloride hydride, bis(indenyl)zirconium monochloride hydride, bis(cyclopentadienyl)zirconium dichloride, bis(cyclopentadienyl) zirconium dibromide, bis(cyclopentadienyl) methyl zirconium monochloride, bis(cyclopentadienyl) ethyl zirconium monochloride, bis(cyclopentadienyl) cyclohexyl zirconium monochloride, bis(cyclopentadienyl) phenyl zirconium monochloride, bis(cyclopentadienyl) benzyl zirconium monochloride, bis(methylcyclopentadienyl)zirconium dichloride, bis(dimethylcyclopentadienyl)zirconium dichloride, bis(n-butylcyclopentadienyl)zirconium dichloride, bis(indenyl)zirconium dichloride, bis(indenyl)zirconium dibromide, bis(cyclopentadienyl)zirconium dimethyl, bis(cyclopentadienyl)zirconium diphenyl, bis(cyclopentadienyl)zirconium dibenzyl, bis(cyclopentadienyl)zirconium monomethoxy monochloride, bis(cyclopentadienyl)zirconium monoethoxy monochloride, bis(methylcyclopentadienyl)zirconium monoethoxy monochloride, bis(cyclopentadienyl)zirconium monophenoxychloride, bis(fluorenyl) zirconium dichloride and the like.

Specific examples of transition metal compounds in the case where M in the general formula (II) is zirconium, at least two ligands having a cycloalkadienyl skeleton are included, and the ligand having at least two cycloalkadienyl skeletons is bonded through an alkylene group such as ethylene, propylene and the like, a substituted alkylene group such as isopropylidene, diphenylmethylene and the like, a silylene group, a substituted silylene group such as dimethylsilylene, or a substituted germanediyl group such as dimethylgermandiyl, diphenylgermandiyl and the like are presented below. Ethylenebis(indenyl) dimethyl zirconium, ethylenebis(indenyl) diethyl zirconium, ethylenebis(indenyl) diphenyl zirconium, ethylenebis(indenyl) methyl zirconium monochloride, ethylenebis(indenyl) ethyl zirconium monochloride, ethylenebis(indenyl) methyl zirconium bromide, ethylenebis(indenyl)zirconium dichloride, ethylenebis(indenyl)zirconium bromide, ethylenebis(4,5,6-tetrahydro-1-indenyl)zirconium dichloride, dimethylsilylenebis(indenyl)zirconium dichloride, diphenylsilylenebis(indenyl) zirconium dichloride, dimethylsilylenebis(2-methyl-4-phenylindenyl)zirconium dichloride, dimethylsilylenebis(2-methyl-4-(1-naphthyl)indenyl)zirconium dichloride, dimethylgermandiyl-bis(indenyl)zirconium dichloride, diphenylgermandiyl-bis(indenyl)zirconium dichloride, dimethylgermandiyl-bis(2-methyl-4-phenylindenyl)zirconium dichloride, dimethylgermandiyl-bis(2-methyl-4-(1-naphthyl)indenyl)zirconium dichloride and the like, and racemic and meso forms and mixtures thereof may also be used.

Only one kind of these transition metal compounds may be used for homogeneous polymerization, or two or more kinds may be used for the purpose of adjusting the molecular weight distribution and the like. In preparing a solid catalyst in advance, only one kind of these transition metal compounds may be used, or two or more kinds may be used for the purpose of adjusting the molecular weight distribution and the like.

The weight ratio of the solid PMAO composition and the transition metal compound represented by the general formula (II) of the present invention in the olefin polymerization catalysts A and B of the present invention can be appropriately determined in consideration of the kinds of solid PMAO composition, transition metal compound, and olefin to be polymerized, polymerization conditions and the like. As an example, the molar ratio (Al/M) of the transition metal M contained in the transition metal compound to aluminum Al contained in the solid PMAO composition is in the range of 1 to 10,000, preferably in the range of 10 to 1,000, and even more preferably in the range of 50 to 300. However, these ranges are not intended to be limiting.

The olefin prepolymer contained in the catalyst B is, for example, a homopolymer of an olefin or a copolymer of olefins. Examples of the homopolymer of olefin include ethylene homopolymer or propylene homopolymer, and copolymers of olefins can be, for example, copolymers of ethylene and/or propylene with hexene-1 and/or octene-1.

The mass of the prepolymerized polymer per unit mass of the solid catalyst (solid PMAO composition+transition metal compound) in the catalyst B is referred to as a prepolymerization degree. That is, assuming that a solid catalyst mass (Yg) has been prepolymerized with respect to a solid catalyst amount (Xg), the prepolymerization degree can be represented by the following formula.

Prepolymerization degree: $(Y-X)/X$

The prepolymerization degree in the catalyst B can be arbitrarily adjusted according to the requirements of the process using the solid catalyst. Specifically, the prepolymerization degree may be in the range of 0.1 to 100, preferably in the range of 0.1 to 30, more preferably in the range of 1 to 10.

The polymerization catalyst B of the present invention containing an olefin prepolymer can be prepared by polymerizing a predetermined amount of olefin(s) as a starting material for the olefin prepolymer in the presence of the solid PMAO composition and the transition metal compound represented by the general formula (II) of the present invention. In the resulting structure, at least a part of the solid PMAO composition of the present invention and the transition metal compound represented by the general formula (II) is encapsulated in the olefin prepolymer which is effective in terms of adjusting the activity of the catalyst composed of the solid PMAO composition and the transition metal compound represented by the general formula (II) and maintaining the mechanical strength (for example, the structure is unlikely to crush).

[Method for Producing Polyolefin]

The present invention is inclusive of a method for producing a polyolefin, the method comprising polymerizing an olefin by using the catalyst of the present invention.

As for the mode of homogeneous polymerization using the solid PMAO composition of the present invention and polymerization using a supported catalyst prepared by using the solid PMAO composition of the present invention, suitable performance is exhibited with any method such as solution polymerization or slurry polymerization using a solvent and bulk polymerization or gas-phase polymerization using no solvent. Further, advantageous performance is demonstrated in either of continuous polymerization and batch type polymerization, and hydrogen and the like as a molecular weight regulator can also be used as necessary.

The monomers used for the polymerization can be single olefin monomers and any compounds that can be used for copolymerization of a combination thereof. Specific examples thereof include α-olefins such as ethylene, propylene, 1-butene, 1-pentene, 1-hexene, 1-decene, 1-hexadecene, 1-octadecene, 1-eicosene, and the like, halogen-substituted olefins such as bisfluoroethylene, trifluoroethylene, tetrafluoroethylene, hexafluoropropene, and the like, and cyclic olefins such as cyclopentene, cyclohexene, norbornene, and the like.

[Drying Treatment of Solid PMAO Composition]

Drying of the solid PMAO composition for measuring the aluminum content and the like of the solid PMAO composition is usually carried out at 40° C. through a sealing pot containing liquid paraffin under full vacuum created by a vacuum pump, and the end point of drying is defined as the time point when no air bubbles are observed in the sealing pot.

EXAMPLES

Hereinafter, the present invention will be described in detail by examples, but the present invention is not limited to the examples.

[Test Methods]

(1) Aluminum Content

The aluminum content of the liquid PMAO composition and the solid PMAO composition was basically determined by adding an excess amount of disodium ethylenediaminetetraacetate to a solution hydrolyzed with a 0.5 N sulfuric acid aqueous solution and then performing back titration with zinc sulfate by using dithizone as an indicator. When the measured concentration was dilute, measurement was carried out using atomic absorption spectrometry.

(2) Specific Surface Area of Solid PMAO Composition

The specific surface area of the solid PMAO composition was determined by using a BET adsorption isotherm and utilizing a gas adsorption phenomenon on the solid surface. BELSORP mini II manufactured by BEL Japan, Inc. was used as the measuring device, and nitrogen gas was used as the measuring gas.

(3) Volume-Based Median Diameter and Particle Size Distribution of Solid PMAO Composition The volume-based median diameter and particle size distribution of the solid PMAO composition were determined by laser diffraction/scattering method under dry nitrogen atmosphere using Mastersizer 2000 Hydro S from Malvern Instrument Ltd. Toluene which was dehydrated and degassed was mainly used as the dispersion medium. Uniformity was defined by the following formula as an index of catalyst particle size distribution.

$$\text{Uniformity} = \Sigma Xi|d(0.5) - Di|/d(0.5)\Sigma Xi \qquad [\text{Math 3}]$$

Here, $Xi$ is the histogram value of particle i, $d(0.5)$ is the volume-based median diameter, and $Di$ is the volume standard diameter of particle i.

(4) Mole Fraction of Methyl Groups

The mole fraction of each component in the PMAO composition was determined from the area ratio attributed to each component by $^1$H-NMR measurement of the PMAO composition. Hereinafter, specific examples of obtaining the mole fractions of Me (PMAO) and Me (TMAL) of the PMAO composition will be described. The mole fraction of the methyl groups derived from PMAO is represented as Me (PMAO). The mole fraction of the methyl groups derived from TMAL is represented as Me (TMAL).

First, $^1$H-NMR measurement of the PMAO composition is carried out with $d_8$-THF as a heavy solvent. The $^1$H-NMR measurement was performed at a measurement temperature of 24° C. by using a 300-MHz Gemini 2000 NMR measuring device of Varian Technologies Japan Limited. An example of a $^1$H-NMR chart is shown in FIG. 1.

(i) A total integrated value of a Me group peak of PMAO containing trimethylaluminoxane appearing from −0.3 ppm to about −1.2 ppm is obtained and this value is taken as I (PMAO).

(ii) The Me group peak derived from TMAL in the vicinity of −1.1 ppm is cut by tangent −1, and the integrated value I (TMAL-Me) thereof is obtained.

(iii) Where the integrated value obtained in (ii) is subtracted from the integrated value I (PMAO) obtained in (i), an integrated value I (PMAO-Me) of Me-groups of only PMAO, which does not contain TMAL, can be obtained. When I (TMAL-Me) and I (PMAO-Me) are normalized by dividing by I (PMAO), the mole fractions of Me (PMAO) and Me (TMAL) can be obtained.

A method using a commercially available curve fitting program, a method using baseline collection, and the like can be used for conveniently performing cutting of each peak.

An analytical sample of the liquid PMAO composition was prepared by adding about 0.5 ml of $d_8$-THF to about 0.05 ml of the liquid PMAO composition. An analytical sample of the solid PMAO composition was prepared by adding 0.5 ml of $d_8$-THF to 10 mg of the liquid PMAO composition.

(5) Circularity

The circularity was determined by analyzing from a SEM image (two-dimensional information) by using the following equation. The measurement was performed on 300 particles. For analysis to determine the circularity, image analysis type particle size distribution measurement software Mac-View (ver. 4) was used.

$$\Psi\omega = \frac{4\pi \times \text{Area}}{(\text{Circumference})^2}, \Psi\omega < 1 \quad \text{[Math. 4]}$$

The following reactions were carried out under a dry nitrogen gas atmosphere, and all solvents were dehydrated and deaerated.

Preliminary Experiment 1 (Benzoic Acid-Al/O=1.17)

(1) Synthesis of Liquid PMAO Composition

A total of 240.8 g (3.34 mol) of TMAL (TMAL) and 680.5 g of toluene were placed in a separable flask having an inner volume of 2 L and equipped with a stirring device. The solution was cooled to 15° C. and 176.6 g (1.43 mol) of benzoic acid was slowly added thereto at such a rate that the temperature of the solution was 25° C. or lower. Thereafter, heat aging was carried out at 50° C. for 1 hr. At this time, the molar ratio of TMAL to the oxygen atoms of benzoic acid was 1.17. The reaction solution was heated at 70° C. for 32 hr and then heated at 60° C. for 6 hr to obtain a toluene solution of the PMAO composition. The resulting solution was a clear liquid without a gel. From the results of aluminum analysis performed after recovering the reaction solution, the reaction yield represented by aluminum atom standard was quantitative. The aluminum concentration of the obtained reaction liquid was 8.67 wt %. The Me (TMAL) amount of the obtained liquid PMAO composition was determined by $^1$H-NMR and found to be 13.9 mol %.

(2) Ethylene Polymerization Evaluation
Polymerization Using Bis(cyclopentadienyl)zirconium Dichloride A total of 250 ml of toluene was introduced into a 500-ml four-necked flask having a magnetic stirring device and heated to 34° C. To this was added 0.16 g (5.93 mmol) of a toluene solution of PMAO based on aluminum atoms, bis(cyclopentadienyl)zirconium dichloride ($Cp_2ZrCl_2$) was further added so that the molar ratio of Al/Zr was 5000, and ethylene gas was blown into the solution while raising the temperature to 40° C. After 10 min, the supply of the ethylene gas was stopped and methanol was added to inactivate the catalyst. The produced polyethylene was filtered and dried, and the polymerization activity was determined to be $50\times10^6$ g-PE/mol-Zr·atm·hr. The molecular weight determined by high-temperature GPC was 180,000, and Mw/Mn was 2.9. The polymer shape was amorphous, and the fouling of the polymerization vessel was remarkable.

Preliminary Experiment 2 (Benzoic Acid-Al/O=1.15)

(1) Synthesis of Liquid PMAO Composition

A toluene solution of the PMAO composition was prepared in the same manner as in Preliminary Experiment 1 except that the molar ratio of TMAL to the oxygen atoms of benzoic acid was 1.15. The resultant solution was a clear liquid without a gel. From the results of aluminum analysis performed after recovering the reaction solution, the reaction yield represented by aluminum atom standard was quantitative. The aluminum concentration of the obtained reaction liquid was 8.90 wt %. The Me (TMAL) amount of the obtained liquid PMAO composition was determined by $^1$H-NMR and found to be 8.3 mol %.

(2) Ethylene Polymerization Evaluation
Polymerization Using Bis(Cyclopentadienyl)Zirconium Dichloride Ethylene polymerization was carried out in the same manner as in Preliminary Experiment 1(2). The produced polyethylene was filtered and dried, and the polymerization activity was determined to be $45\times10^6$ g-PE/mol-Zr·atm·hr. The molecular weight determined by high-temperature GPC was 200,000, and Mw/Mn was 2.6. The polymer shape was amorphous, and the fouling of the polymerization vessel was remarkable.

Preliminary Experiment 3 (Benzoic Acid-Al/O=1.20)

(1) Synthesis of Liquid PMAO Composition

A toluene solution of the PMAO composition was prepared in the same manner as in Preliminary Experiment 1 except that the molar ratio of TMAL to the oxygen atoms of benzoic acid was 1.20. The resultant solution was a clear liquid without a gel. From the results of aluminum analysis performed after recovering the reaction solution, the reaction yield represented by aluminum atom standard was quantitative. The aluminum concentration of the obtained reaction liquid was 8.80 wt %. The Me (TMAL) amount of the obtained liquid PMAO composition was determined by $^1$H-NMR and found to be 15.3 mol %.

(2) Ethylene Polymerization Evaluation
Polymerization Using Bis(Cyclopentadienyl)Zirconium Dichloride Ethylene polymerization was carried out in the same manner as in Preliminary Experiment 1(2). The produced polyethylene was filtered and dried, and the polymerization activity was determined to be $60\times10^6$ g-PE/mol-Zr·atm·hr. The molecular weight determined by high-temperature GPC was 170,000, and Mw/Mn was 3.0. The polymer shape was amorphous, and the fouling of the polymerization vessel was remarkable.

Preliminary Experiment 4 (Benzoic Acid-Al/O=1.24)

(1) Synthesis of Liquid PMAO Composition

A toluene solution of the PMAO composition was prepared in the same manner as in Preliminary Experiment 1 except that the molar ratio of TMAL to the oxygen atoms of benzoic acid was 1.24. The resultant solution was a clear liquid without a gel. From the results of aluminum analysis performed after recovering the reaction solution, the reaction yield represented by aluminum atom standard was quantitative. The aluminum concentration of the obtained reaction liquid was 9.03 wt %. The Me (TMAL) amount of the obtained liquid PMAO composition was determined by $^1$H-NMR and found to be 19.3 mol %.

(2) Ethylene Polymerization Evaluation
Polymerization Using Bis(Cyclopentadienyl)Zirconium Dichloride Ethylene polymerization was carried out in the same manner as in Preliminary Experiment 1(2). The produced polyethylene was filtered and dried, and the polymerization activity was determined to be $63\times10^6$ g-PE/mol-Zr-atm-hr. The molecular weight determined by high-temperature GPC was 185,000, and Mw/Mn was 2.9. The polymer shape was amorphous, and the fouling of the polymerization vessel was remarkable.

Preliminary Experiment 5 (benzoic Acid-Al/O=1.40)

(1) Synthesis of Liquid PMAO Composition

A toluene solution of the PMAO composition was prepared in the same manner as in Preliminary Experiment 1 except that the molar ratio of TMAL to the oxygen atoms of benzoic acid was 1.40. The resultant solution was a clear liquid without a gel. From the results of aluminum analysis performed after recovering the reaction solution, the reaction yield represented by aluminum atom standard was quantitative. The aluminum concentration of the obtained reaction liquid was 9.03 wt %. The Me (TMAL) amount of the obtained liquid PMAO composition was determined by $^1$H-NMR and found to be 29.2 mol %.

(2) Ethylene Polymerization Evaluation
Polymerization Using Bis(Cyclopentadienyl)Zirconium Dichloride Ethylene polymerization was carried out in the same manner as in Preliminary Experiment 1(2). The produced polyethylene was filtered and dried, and the polymerization activity was determined to be $65 \times 10^6$ g-PE/mol-Zr·atm·hr. The molecular weight determined by high-temperature GPC was 180,000, and Mw/Mn was 3.1. The polymer shape was amorphous, and the fouling of the polymerization vessel was remarkable.

Reference Example 1

(1) Synthesis of Solid PMAO Composition

A total of 272.1 g (0.874 mol-Al, initial use amount) of a toluene solution of the liquid PMAO composition prepared in Preliminary Experiment 1 (Al/O=1.17) was introduced at room temperature into a SUS autoclave having an inner volume of 1 L and equipped with a stirring device. Thereafter, the temperature was raised to 120° C. (temperature rise rate: 1.5° C./min) while stirring at 300 rpm, and the solution was heated at that temperature for 8 hr. A solid PMAO composition precipitated during heating.

After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 100% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition (a) Aluminum Content

The aluminum content of the dried solid PMAO composition was measured to be 41.0 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) was 6.1 μm and the uniformity was 0.230.

(c) Circularity

After washing with toluene, the solid MAO composition subjected to drying treatment was subjected to SEM measurement and analyzed by Mac-View (ver. 4), the circularity was found to be 0.61.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a) described hereinbelow.

(b) Ethylene Polymerization Evaluation

Polymerization evaluation was carried out using the prepared BI-supported solid PMAO catalyst in the same manner as in Example 1(3)b) described hereinbelow, except that the polymerization time was 45 min. From the dry polymer mass obtained, the polymerization activity of this catalyst was found to be 21.1 kg-PE/g-cat·hr.

(c) Collected Polymer Evaluation

The particle diameter of the obtained polymer was 153 μm, and Span was 0.74. In addition, the bulk density (BD) of the polymer was determined to be 0.400 g/cc.

(4) Prepolymerization (a) Preparation of Prepolymerized Catalyst

A prepolymerized catalyst having the prepolymerization degree of 1.0 was prepared from the BI-supported solid PMAO catalyst in ethylene. A specific prepolymerization method is described hereinbelow.

A glass autoclave (manufactured by Taiatsu Techno Corporation) having an internal volume of 1 L and equipped with a stirring device was used, and 140.3 g of a toluene slurry (slurry concentration: 58.6 g-BI-supported solid PMAO/L) containing 9.51 g of the BI-supported solid PMAO catalyst was introduced therein. Toluene was added thereto, and the slurry concentration was adjusted to 20 g/L. To this was added 1 ml of a toluene solution (1 mol/L) of triethylaluminum (AlEt$_3$) as a scavenger, and the internal temperature was adjusted to the range of 5° C. to 10° C. Prepolymerization was carried out by introducing ethylene at a rate of 150 cc/min using a mass flow controller under stirring of the catalyst slurry.

After the addition of the target loading amount of ethylene, ethylene feeding was stopped and aging for 30 min was carried out. The reaction slurry was recovered and the particle size distribution of the prepolymerized particles was measured. As a result, the particle diameter was 7.5 μm and the uniformity was 0.261. The prepolymerization degree was determined by calcining the prepolymerized catalyst in an electric furnace at 900° C. and determining the amount of Al or Zr in the remaining ash by ICP and was found to be 0.98.

(b) Polymerization Evaluation of Prepolymerized Catalyst

Polymerization evaluation was carried out in the same manner as in Example 1(3)b) described below, except that the prepolymerized catalyst prepared above was used. Based on the mass of the obtained dry polymer, the polymerization activity per prepolymerized catalyst was determined to be 13.1 kg-PE/g-cat·hr.

Reference Example 2

(1) Synthesis of Solid PMAO Composition

A 1-L glass autoclave (manufactured by Taiatsu Techno Corporation) was used instead of the SUS autoclave having an inner volume of 1 L and equipped with a stirring device, and 231.1 g (0.742 mol-Al, initial use amount) of a toluene solution of the liquid PMAO composition prepared in Preliminary Experiment 1 (Al/O=1.17) was introduced therein at room temperature. Thereafter, the temperature was raised to 120° C. (temperature rise rate: 1.5° C./min) while stirring at 250 rpm, and the solution was heated at that temperature for 8 hr. A solid PMAO composition precipitated during heating.

After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 100% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition (a) Aluminum Content

The aluminum content of the dried solid PMAO composition was measured to be 41.3 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) was 7.4 μm and the uniformity was 0.233.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a) described hereinbelow.

(b) Ethylene Polymerization Evaluation

Polymerization evaluation was carried out using the prepared BI-supported solid PMAO catalyst in the same manner as in Example 1(3)b) described hereinbelow. Based on the mass of the obtained dry polymer, the polymerization activity of this catalyst was found to be 17.5 kg-PE/g-cat·hr.

(c) Collected Polymer Evaluation

The particle diameter of the obtained polymer was 174 μm, and Span was 0.67. In addition, the bulk density (BD) of the polymer was determined to be 0.440 g/cc.

Reference Example 3

(1) Synthesis of Solid PMAO Composition

A solid PMAO composition was prepared in the same manner as in Reference Example 1, except that a toluene solution of the liquid PMAO composition prepared in Preliminary Experiment 2 (Al/O=1.15) was used in a SUS autoclave having an inner volume of 1 L and equipped with a stirring device. The precipitation rate of the solid PMAO composition determined from the amount of Al remaining in the supernatant was 100% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition (a) Aluminum Content

The aluminum content of the dried solid PMAO composition was measured to be 41.0 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) was 5.2 μm and the uniformity was 0.256.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a) described hereinbelow.

(b) Ethylene Polymerization Evaluation

Polymerization evaluation was carried out using the prepared BI-supported solid PMAO catalyst in the same manner as in Example 1(3)b) described hereinbelow, except that the polymerization time was set to 45 min. Based on the mass of the obtained dry polymer, the polymerization activity of this catalyst was found to be 23.5 kg-PE/g-cat·hr.

(c) Collected Polymer Evaluation

The particle diameter of the obtained polymer was 170 μm, and Span was 0.80. In addition, the bulk density (BD) of the polymer was determined to be 0.395 Wm.

Reference Example 4

(1) Synthesis of Solid PMAO Composition

A solid PMAO composition was prepared in the same manner as in Reference Example 1, except that a toluene solution of the liquid PMAO composition prepared in Preliminary Experiment 3 (Al/O=1.20) was used in a SUS autoclave having an inner volume of 1 L and equipped with a stirring device. The precipitation rate of the solid PMAO composition determined from the amount of Al remaining in the supernatant was 99.2% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition (a) Aluminum Content

The aluminum content of the dried solid PMAO composition was measured to be 40.5 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) was 14.6 μm and the uniformity was 0.232.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a) described hereinbelow.

(b) Ethylene Polymerization Evaluation

Polymerization evaluation was carried out using the prepared BI-supported solid PMAO catalyst in the same manner as in Example 1(3)b) described hereinbelow. Based on the mass of the obtained dry polymer, the polymerization activity of this catalyst was found to be 10.7 kg-PE/g-cat·hr.

(c) Collected Polymer Evaluation

The particle diameter of the obtained polymer was 250 and Span was 1.33. In addition, the bulk density (BD) of the polymer was determined to be 0.294 g/cc.

Representative solid PMAO composition production conditions of Examples 1 to 17 and physical properties of the produced solid PMAO compositions are listed in Table 1. Information on the polymerization experiment using the solid PMAO composition is listed in Table 2.

Example 1

(1) Synthesis of Solid PMAO Composition

Step (a)

A total of 270.6 g (0.869 mol-Al, initial use amount) of a toluene solution of the liquid PMAO composition prepared in Preliminary Experiment 1 (Al/O=1.17) was introduced at room temperature into a SUS autoclave having an inner volume of 1 L and equipped with a stirring device. Thereafter, the temperature was raised to 120° C. (temperature rise rate: 1.5° C./min) while stirring at 300 rpm, and the solution was heated at that temperature for 3 hr. A solid PMAO composition precipitated during heating. The volume-based median diameter (d(0.5)) of the solid PMAO formed by sampling was determined to be 6.4 μm and the uniformity thereof was 0.231. The precipitation rate of the solid PMAO composition determined from the amount of Al remaining in the supernatant was 98.6% based on aluminum atoms of the liquid PMAO composition used.

Step (b)

The temperature of the reaction slurry was lowered to 50° C. to 60° C. and the stirring number was set to 150 μm. To this was additionally added 27.6 g (0.089 mol-Al, addition amount 10.2 mol %-Al relative to the initial use amount 0.869 mol-Al) of a toluene solution of the liquid PMAO composition prepared in Preliminary Experiment 1 (Al/O=1.17), and heating was performed at that temperature for 1 hr (the Al concentration after the addition is a value obtained by dividing the total of the remaining amount in the previous step and the amount of additionally added Al by the amount of solution; the numerical values are shown in Table 1).

Step (c)

Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 99.4% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition Obtained in Step (c)

(a) Aluminum Content

The aluminum content of the dried solid PMAO composition was measured to be 41.1 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 8.3 μm and the uniformity was 0.263.

(3) Ethylene Polymerization Evaluation (a) Preparation of Bisindenylzirconium Dichloride (BI)-Supported Solid PMAO Catalyst A total of 46.8 g of a toluene slurry of the solid PMAO composition (slurry concentration 9.16 wt %-solid PMAO composition, 1.75 g-Al (65.1 mmol-Al) based on aluminum atoms) was added to a 300-ml four-necked flask having a magnetic stirring device, and then 40 ml of toluene was added, followed by stirring. To this was added a toluene slurry of BI at room temperature so that the molar ratio of Al/Zr was 200, and a reaction was performed under light shielding at that temperature for 15 hr to obtain a BI-supported solid PMAO catalyst.

(b) Ethylene Polymerization Evaluation

A total of 800 ml of hexane and 1 ml (0.5 mmol) of a hexane solution of 0.5 mol/L of triethylaluminum were added to a 1 L autoclave having a catalyst charging pot, a temperature measuring device and a magnetic stirring device, ethylene pressurization (0.8 MPa)-degassing were performed twice, and $N_2$ in the autoclave was replaced with ethylene. Thereafter, the solution in the autoclave was heated to 75° C., and 18.1 mg of the BI-supported solid PMAO catalyst was added from the charging pot. Thereafter, the inside of the autoclave system was immediately pressurized with ethylene to 0.8 MPa, and polymerization was started. The polymerization was carried out for 1 hr, during which the temperature in the autoclave was controlled to 80° C.±1° C. using a heating medium and a refrigerant. After the lapse of the polymerization time, the supply of ethylene gas was stopped, the autoclave was cooled to 30° C. or lower with the refrigerant, and the gas in the system was discharged to a vent line. A small amount of a methanol solution of 0.5 wt %-BHT (BHT: 2,6-di-t-butylhydroxytoluene) was added, and the obtained polymer was collected by filtration. The polymer collected by filtration was dried under reduced pressure at 50° C. using a vacuum drier. From the obtained polymer mass, the polymerization activity of this catalyst was determined to be 18.0 kg-PE/g-cat·hr.

(c) Collected Polymer Evaluation

The particle diameter of the obtained polymer was 174 μm, and Span ([d(0.9)−d(0.1)]/d(0.5)) was 0.833. Also, the bulk density (BD) of the polymer was determined to be 0.390 g/cc.

Example 2

(1) Synthesis of Solid PMAO Composition

A solid PMAO composition was prepared in the same manner as in Example 1, except that the additional addition amount of a toluene solution of the liquid PMAO composition prepared in Preliminary Experiment 1 (Al/O=1.17) in the step (b) was 30.0 mol %-Al.

Step (a)

The precipitation rate of the solid PMAO composition produced before the additional addition of a toluene solution of the liquid PMAO composition was 98.3% based on aluminum atoms of the liquid PMAO composition used.

Steps (b) and (c)

The precipitation rate of the solid PMAO composition produced by heating after the additional addition of a toluene solution of the liquid PMAO composition was 98.3% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 40.5 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 11.0 μm and the uniformity was 0.252. Meanwhile, the volume-based median diameter d(0.5) of the solid PMAO composition produced in the step (a) before the additional addition of a toluene solution of the liquid PMAO composition was 6.1 μm and the uniformity was 0.237.

(3) Ethylene Polymerization Evaluation a) Preparation of Bisindenylzirconium Dichloride (BI)-Supported Solid PMAO Catalyst A BI-supported solid PMAO catalyst was prepared by loading BI in the same manner as in Example 1(3)a).

b) Ethylene Polymerization Evaluation

Polymerization evaluation was carried out using the prepared BI-supported solid PMAO catalyst in the same manner as in Example 1(3)b) except that the polymerization time was 50 min. From the obtained dry polymer mass, the polymerization activity of this catalyst was found to be 19.5 kg-PE/g-cat·hr.

c) Collected Polymer Evaluation

The particle diameter of the obtained polymer was 286 μm, and Span was 0.741. Also, the bulk density (BD) of the polymer was determined to be 0.381 Woo.

Example 3

(1) Synthesis of Solid PMAO Composition

A solid PMAO composition was prepared in the same manner as in Example 1, except that the additional addition amount of a toluene solution of the liquid PMAO composition prepared in Preliminary Experiment 1 (Al/O=1.17) was 51.0 mol %-Al.

Step (a)

The precipitation rate of the solid PMAO composition produced before the additional addition of a toluene solution of the liquid PMAO composition was 98.2% based on aluminum atoms of the liquid PMAO composition used.

Steps (b) and (c)

The precipitation rate of the solid PMAO composition produced by heating after the additional addition of a toluene solution of the liquid PMAO composition was 98.0% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.6 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 14.0 μm and the uniformity was 0.232. Meanwhile, the volume-based median diameter d(0.5) of the solid PMAO composition produced in the step (a) before the additional addition of a toluene solution of the liquid PMAO composition was 6.2 μm and the uniformity was 0.235.

(c) Circularity

The solid PMAO composition obtained in the step (c) was washed with toluene and then subjected to drying treatment, and SEM measurement was carried out. When analyzed by Mac-View (ver. 4), the circularity was 0.61.

(3) Ethylene Polymerization Evaluation a) Preparation of Bisindenylzirconium Dichloride (BI)-Supported Solid PMAO Catalyst A BI-supported solid PMAO catalyst was prepared by loading BI in the same manner as in Example 1(3)a).

b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 16.6 kg-PE/g-cat·hr.

(c) Collected Polymer Evaluation

The particle diameter of the obtained polymer was 299 μm, and Span was 0.888. Also, the bulk density (BD) of the polymer was determined to be 0.411 g/cc.

(4) Prepolymerization (a) Preparation of Prepolymerized Catalyst

A prepolymerized catalyst having the prepolymerization degree of 1.0 was prepared using the BI-supported solid PMAO catalyst in the same manner as in Reference Example 1(4)a). The particle diameter was 21.2 μm and the uniformity was 0.275. The measured value of the prepolymerization degree was 1.02.

(b) Polymerization Evaluation of Prepolymerized Catalyst

Polymerization evaluation was carried out in the same manner as in Example 1(3)b), except that the prepolymerized catalyst prepared above was used. Based on the mass of the obtained dry polymer, the polymerization activity per prepolymerized catalyst was determined to be 10.5 kg-PE/g-cat·hr.

Example 4

(1) Synthesis of Solid PMAO Composition

A solid PMAO composition was prepared in the same manner as in Example 1, except that the additional addition amount of a toluene solution of the liquid PMAO composition prepared in Preliminary Experiment 1 (Al/O=1.17) in the step (b) was 93.6 mol %-Al.

Step (a)

The precipitation rate of the solid PMAO composition produced before the additional addition of a toluene solution of the liquid PMAO composition was 98.7% based on aluminum atoms of the liquid PMAO composition used.

Steps (b) and (c)

The precipitation rate of the solid PMAO composition produced by heating after the additional addition of a toluene solution of the liquid PMAO composition was 97.0% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 40.9 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 19.0 μm and the uniformity was 0.235. Meanwhile, the volume-based median diameter d(0.5) of the solid PMAO composition produced in the step (a) before the additional addition of a toluene solution of the liquid PMAO composition was 6.0 μm and the uniformity was 0.238.

(3) Ethylene Polymerization Evaluation (a) Preparation of Bisindenyizirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 12.5 kg-PE/g-cat·hr.

(c) Collected Polymer Evaluation

The particle diameter of the obtained polymer was 184 µm, and Span was 1.02. Also, the bulk density (BD) of the polymer was determined to be 0.301 g/cc.

Example 5

(1) Synthesis of Solid PMAO Composition

A solid PMAO composition was prepared in the same manner as in Example 1, except that the additional addition amount of a toluene solution of the liquid PMAO composition prepared in Preliminary Experiment 1 (Al/O=1.17) in the step (b) was 50.9 mol %-Al, after heating for 1 hr at 50° C. to 60° C. in the step (c), the temperature was raised to 120° C. (temperature rise rate 1.5° C./min) without heating at 90° C. for 3 hr, and heating was performed at that temperature for 4 hr.

Step (a)

The precipitation rate of the solid PMAO composition produced before the additional addition of a toluene solution of the liquid PMAO composition was 98.8% based on aluminum atoms of the liquid PMAO composition used.

Steps (b) and (c)

The precipitation rate of the solid PMAO composition produced by heating after the additional addition of a toluene solution of the liquid PMAO composition was 99.8% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.8 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 13.3 µm and the uniformity was 0.233. Meanwhile, the volume-based median diameter d(0.5) of the solid PMAO composition produced in the step (a) before the additional addition of a toluene solution of the liquid PMAO composition was 6.3 µm and the uniformity was 0.236.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 11.6 kg-PE/g-cat·hr.

(c) Collected Polymer Evaluation

The particle diameter of the obtained polymer was 304 µm, and Span was 0.722. Also, the bulk density (BD) of the polymer was determined to be 0.405 g/cc.

Example 6

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, the additional addition amount of a toluene solution of the liquid PMAO composition prepared in Preliminary Experiment 1 (Al/O=1.17) in the step (b) was set to 94.3 mol %-Al, and 87 g of toluene was added before adding the toluene solution (addition amount of 94.3 mol %-Al to the initial use amount) of the liquid PMAO composition prepared in Preliminary Experiment 1 (Al/O=1.17).

Step (a)

The precipitation rate of the solid PMAO composition produced before the additional addition of a toluene solution of the liquid PMAO composition was 98.8% based on aluminum atoms of the liquid PMAO composition used.

Steps (b) and (c)

The precipitation rate of the solid PMAO composition produced by heating after the additional addition of a toluene solution of the liquid PMAO composition was 97.5% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 40.6 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 21.1 µm and the uniformity was 0.234. Meanwhile, the volume-based median diameter d(0.5) of the solid PMAO composition produced in the step (a) before the additional addition of a toluene solution of the liquid PMAO composition was 6.0 µm and the uniformity was 0.232.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 15.0 kg-PE/g-cat·hr.

(c) Collected Polymer Evaluation

The particle diameter of the obtained polymer was 413 and Span was 0.96. Also, the bulk density (BD) of the polymer was determined to be 0.339 g/cc.

Example 7

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, 174 g of toluene was added before adding a toluene solution of the liquid PMAO composition prepared in Preliminary Experiment 1 (Al/O=1.17) in the step (b), and the additional addition amount of a toluene solution of the liquid PMAO composition prepared in Preliminary Experiment 1 (Al/O=1.17) was set to 98.5 mol %-Al.

Step (a)

The precipitation rate of the solid PMAO composition produced before the additional addition of a toluene solution of the liquid PMAO composition was 98.5% based on aluminum atoms of the liquid PMAO composition used.

Steps (b) and (c)

The precipitation rate of the solid PMAO composition produced by heating after the additional addition of a toluene solution of the liquid PMAO composition was 96.6% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 40.1 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 24.0 μm and the uniformity was 0.252. Meanwhile, the volume-based median diameter d(0.5) of the solid PMAO composition produced in the step (a) before the additional addition of a toluene solution of the liquid PMAO composition was 6.1 μm and the uniformity was 0.235.

(c) Circularity

The solid PMAO composition obtained in the step (c) was washed with toluene and then subjected to drying treatment, and SEM measurement was carried out. When analyzed by Mac-View (ver. 4), the circularity was 0.70.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 16.5 kg-PE/g-cat·hr.

(c) Collected Polymer Evaluation

The particle diameter of the obtained polymer was 415 μm, and Span was 0.98. Also, the bulk density (BD) of the polymer was determined to be 0.338 g/cc.

Example 8

(1) Synthesis of Solid PMAO Composition

Step (a)

A total of 233.1 g (0.749 mol-Al, initial use amount) of a toluene solution of the liquid PMAO composition prepared in Preliminary Experiment 1 (Al/O=1.17) was introduced at room temperature into a glass autoclave (manufactured by Taiatsu Techno Corporation) having an inner volume of 1 L and equipped with a stirring device. Thereafter, the temperature was raised to 120° C. (temperature rise rate: 1.5° C./min) while stirring at 250 rpm, and the solution was heated at that temperature for 3 hr. A solid PMAO composition precipitated during heating. The volume-based median diameter (d(0.5)) of the solid PMAO formed by sampling was determined to be 6.9 μm and the uniformity thereof was 0.244. The precipitation rate of the solid PMAO composition was 98.6% based on aluminum atoms of the liquid PMAO composition used.

Steps (b) and (c) (First Cycle)

The temperature of the reaction slurry was lowered to 50° C. to 60° C. and the stirring number was set to 125 μm. A total of 65.1 g of the supernatant was drained before adding a toluene solution of the liquid PMAO composition prepared in Preliminary Experiment 1 (Al/O=1.17). To this was added 74.1 g (0.238 mol-Al, addition amount 31.8 mol %-Al relative to the initial use amount) of a toluene solution of the liquid PMAO composition prepared in Preliminary Experiment 1 (Al/O=1.17), and heating was performed at that temperature for 1 hr. Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. The volume-based median diameter (d(0.5)) of the solid PMAO formed by sampling was found to be 12.4 μm and the uniformity thereof was 0.277. The precipitation rate of the solid PMAO composition was 99.3% based on aluminum atoms of the liquid PMAO composition used.

Steps (b) and (c) (Second Cycle)

The temperature of the reaction slurry was lowered to 50° C. to 60° C. To this was added 115.3 g (0.370 mol-Al, addition amount 49.5 mol %-Al relative to the initial use amount) of a toluene solution of the liquid PMAO composition prepared in Preliminary Experiment 1 (Al/O=1.17), and heating was performed at that temperature for 1 hr. Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 98.5% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition Obtained in Step (c) of Second Cycle (a) Aluminum Content The aluminum content of the dried solid PMAO composition was measured and found to be 40.3 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 18.6 μm and the uniformity was 0.28.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 10.5 kg-PE/g-cat·hr.

(c) Collected Polymer Evaluation

The particle diameter of the obtained polymer was 295 μm, and Span was 0.88. Also, the bulk density (BD) of the polymer was determined to be 0.356 g/cc.

Example 9

(1) Synthesis of Solid PMAO Composition

Step (a)

A total of 230.5 g (0.740 mol-Al, initial use amount) of a toluene solution of the liquid PMAO composition prepared in Preliminary Experiment 1 (Al/O=1.17) was introduced at room temperature into a glass autoclave (manufactured by Taiatsu Techno Corporation) having an inner volume of 1 L and equipped with a stirring device. Thereafter, the temperature was raised to 120° C. (temperature rise rate: 1.5° C./min) while stirring at 250 rpm, and the solution was heated at that temperature for 3 hr. A solid PMAO composition precipitated during heating. The volume-based median diameter (d(0.5)) of the solid PMAO formed by sampling was determined to be 7.3 μm and the uniformity thereof was 0.243. The precipitation rate of the solid PMAO composition was 98.3% based on aluminum atoms of the liquid PMAO composition used.

Steps (b) and (c) (First Cycle)

The temperature of the reaction slurry was lowered to 50° C. to 60° C. and the stirring number was set to 125 μm. A total of 81.6 g of the supernatant was drained before adding a toluene solution of the liquid PMAO composition prepared in Preliminary Experiment 1 (Al/O=1.17). To this was added 71.5 g (0.230 mol-Al, addition amount 31.0 mol %-Al relative to the initial use amount) of a toluene solution of the liquid PMAO composition prepared in Preliminary Experiment 1 (Al/O=1.17), and heating was performed at that temperature for 1 hr. Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. The volume-based median diameter (d(0.5)) of the solid PMAO formed by sampling was found to be 12.5 μm and the uniformity thereof was 0.280. The precipitation rate of the solid PMAO composition was 99.0% based on aluminum atoms of the liquid PMAO composition used.

Steps (b) and (c) (Second Cycle)

The temperature of the reaction slurry was lowered to 50° C. to 60° C. To this was added 231.9 g (0.745 mol-Al, addition amount 100.6 mol %-Al relative to the initial use amount) of a toluene solution of the liquid PMAO composition prepared in Preliminary Experiment 1 (Al/O=1.17), and heating was performed at that temperature for 1 hr. Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 98.8% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition Obtained in Step (c) of Second Cycle (a) Aluminum Content The aluminum content of the dried solid PMAO composition was measured and found to be 40.9 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 22.2 μm and the uniformity was 0.280.

(c) Circularity

The solid PMAO composition obtained in the second step (c) was washed with toluene and then subjected to drying treatment, and SEM measurement was carried out. When analyzed by Mac-View (ver. 4), the circularity was 0.74.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 10.2 kg-PE/g-cat·hr.

(c) Collected Polymer Evaluation

The particle diameter of the obtained polymer was 305 μm, and Span was 0.99. Also, the bulk density (BD) of the polymer was determined to be 0.334 g/cc.

Example 10

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, a toluene solution of the liquid PMAO composition prepared in Preliminary Experiment 3 (Al/O=1.20) in the step (a) was used, and the additional addition amount of a toluene solution of the liquid PMAO composition prepared in Preliminary Experiment 3 (Al/O=1.20) in the step (b) was set to 52.0 mol %-Al.

Step (a)

The precipitation rate of the solid PMAO composition produced before the additional addition of a toluene solution of the liquid PMAO composition was 96.7% based on aluminum atoms of the liquid PMAO composition used.

Steps (b) and (c)

The precipitation rate of the solid PMAO composition produced by heating after the additional addition of a toluene solution of the liquid PMAO composition was 92.2% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.1 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 31.7 μm and the uniformity was 0.275. Meanwhile, the volume-based median diameter d(0.5) of the solid PMAO composition produced in the step (a) before the additional addition of a toluene solution of the liquid PMAO composition was 15.0 μm and the uniformity was 0.235.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 11.0 kg-PE/g-cat·hr.

(c) Collected Polymer Evaluation

The particle diameter of the obtained polymer was 350 μm, and Span was 1.20. Also, the bulk density (BD) of the polymer was determined to be 0.310 g/cc.

Example 11

(1) Synthesis of Solid PMAO Composition

Step (a)

A total of 266.9 g (0.896 mol-Al, initial use amount) of a toluene solution of the liquid PMAO composition prepared in Preliminary Experiment 3 (Al/O=1.20) was introduced at room temperature into a SUS autoclave having an inner volume of 1 L and equipped with a stirring device. Thereafter, the temperature was raised to 120° C. (temperature rise rate: 1.5° C./min) while stirring at 300 rpm, and the solution was heated at that temperature for 3 hr. A solid PMAO composition precipitated during heating. The volume-based median diameter (d(0.5)) of the solid PMAO formed by sampling was determined to be 9.2 μm and the uniformity thereof was 0.227. The precipitation rate of the solid PMAO composition was 97.0% based on aluminum atoms of the liquid PMAO composition used.

Steps (b) and (c)

The temperature of the reaction slurry was lowered to 50° C. to 60° C. and the stirring number was set to 150 μm. To this was added 142.2 g (0.457 mol-Al, addition amount 51.0 mol %-Al relative to the initial use amount) of a toluene solution of the liquid PMAO composition prepared in Preliminary Experiment 1 (Al/O=1.17), and heating was performed at that temperature for 1 hr. Thereafter, the temperature was raised to 90° C. (temperature rise rate: 1.5° C./min), and heating was performed at that temperature for 3 hr. Further, the temperature was raised to 120° C. (temperature rise rate: 1.5° C./min), and heating was performed at that temperature for 1 hr. After cooling the reaction slurry to about 30° C., the reaction solution was recovered. After removing the supernatant by decantation of the solid PMAO composition, washing operation was performed by decantation four times with 200 ml of toluene. The precipitation rate of the solid PMAO composition determined from the amount of Al remaining in the supernatant was 97.2% based on aluminum atoms of the liquid PMAO composition used. A part of the resulting solid PMAO composition slurry was sampled and dried under reduced pressure at 40° C. to obtain a dry solid PMAO composition.

(2) Analysis of Solid PMAO Composition Obtained in Step (c)

(a) Aluminum Content

The aluminum content of the dried solid PMAO composition was measured and found to be 41.5 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the finally obtained solid PMAO composition was 18.1 urn and the uniformity was 0.255.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b). Based on the mass of the obtained dry polymer, the polymerization activity of this catalyst was found to be 15.2 kg-PE/g-cat·hr.

(c) Collected Polymer Evaluation

The particle diameter of the obtained polymer was 366 μm, and Span was 0.90. Also, the bulk density (BD) of the polymer was determined to be 0.355 g/cc.

Example 12

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, a toluene solution of the liquid PMAO composition prepared in Preliminary Experiment 2 (Al/O=1.15) in the step (a) was used, and the additional addition amount of a toluene solution of the liquid PMAO composition prepared in Preliminary Experiment 2 (Al/O=1.15) in the step (b) was set to 50.5 mol %-Al.

Step (a)

The precipitation rate of the solid PMAO composition produced before the additional addition of a toluene solution of the liquid PMAO composition was 100% based on aluminum atoms of the liquid PMAO composition used.

Steps (b) and (c)

The precipitation rate of the solid PMAO composition produced by heating after the additional addition of a toluene solution of the liquid PMAO composition was 99.9% based on aluminum atoms of the liquid PMAO composition used.

(2) Analysis of Solid PMAO Composition (a) Aluminum Content

The aluminum content of the dried solid PMAO composition was measured and found to be 42.2 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 10.8 μm and the uniformity was 0.252. Meanwhile, the volume-based median diameter d(0.5) of the solid PMAO composition produced in the step (a) before the additional addition of a toluene solution of the liquid PMAO composition was 5.0 μm and the uniformity was 0.242.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 45 min. Based on the mass of the obtained dry polymer, the polymerization activity of this catalyst was found to be 22.5 kg-PE/g-cat·hr.

(c) Collected Polymer Evaluation

The particle diameter of the obtained polymer was 296 μm, and Span was 0.743. Also, the bulk density (BD) of the polymer was determined to be 0.410 g/cc.

Example 13

(1) Synthesis of Solid PMAO Composition

A solid PMAO composition was prepared in the same manner as in Example 1, except that a SUS autoclave having an internal volume of 1 L and equipped with a stirring device was used, a toluene solution of the liquid PMAO composition prepared in Preliminary Experiment 1 (Al/O=1.17) in the step (a) was used, and the additional addition amount of a toluene solution of the liquid PMAO composition prepared in Preliminary Experiment 5 (Al/O=1.40) in the step (b) was set to 98 mol %-Al.

Step (a)

The precipitation rate of the solid PMAO composition produced before the additional addition of a toluene solution of the liquid PMAO composition was 99.1% based on aluminum atoms of the liquid PMAO composition used.

Steps (b) and (c)

The precipitation rate of the solid PMAO composition produced by heating after the additional addition of a toluene solution of the liquid PMAO composition was 81.5% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 42.1 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 12.4 μm and the uniformity was 0.252. Meanwhile, the volume-based median diameter d(0.5) of the solid PMAO composition produced in the step (a) before the additional addition of a toluene solution of the liquid PMAO composition was 6.1 μm and the uniformity was 0.242.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 40 min. Based on the mass of the obtained dry polymer, the polymerization activity of this catalyst was found to be 25.3 kg-PE/g-cat·hr.

(c) Collected Polymer Evaluation

The particle diameter of the obtained polymer was 311 μm, and Span was 0.83. Also, the bulk density (BD) of the polymer was determined to be 0.40 g/cc.

Example 14

(1) Synthesis of Solid PMAO Composition

A solid PMAO composition was prepared in the same manner as in Example 1, except that a SUS autoclave having an internal volume of 1 L and equipped with a stirring device was used, a toluene solution of the liquid PMAO composition prepared in Preliminary Experiment 1 (Al/O=1.17) in the step (a) was used, and the additional addition amount of a toluene solution of the liquid PMAO composition prepared in Preliminary Experiment 4 (Al/O=1.24) in the step (b) was set to 95 mol %-Al.

Step (a)

The precipitation rate of the solid PMAO composition produced before the additional addition of a toluene solution of the liquid PMAO composition was 99.5% based on aluminum atoms of the liquid PMAO composition used.

Steps (b) and (c)

The precipitation rate of the solid PMAO composition produced by heating after the additional addition of a toluene solution of the liquid PMAO composition was 91.2% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.2 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 19.8 μm and the uniformity was 0.249. Meanwhile, the volume-based median diameter d(0.5) of the solid PMAO composition produced in the step (a) before the additional addition of a toluene solution of the liquid PMAO composition was 6.2 μm and the uniformity was 0.238.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 30 min. Based on the mass of the obtained dry polymer, the polymerization activity of this catalyst was found to be 32.0 kg-PE/g-cat·hr.

(c) Collected Polymer Evaluation

The particle diameter of the obtained polymer was 480 µm, and Span was 1.14. Also, the bulk density (BD) of the polymer was determined to be 0.364 g/cc.

Example 15

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, a toluene solution of the liquid PMAO composition prepared in Preliminary Experiment 1 (Al/O=1.17) in the step (a) was used, and the additional addition amount of a toluene solution of the liquid PMAO composition prepared in Preliminary Experiment 4 (Al/O=1.24) in the step (b) was set to 154 mol %-Al.

Step (a)

The precipitation rate of the solid PMAO composition produced before the additional addition of a toluene solution of the liquid PMAO composition was 99.6% based on aluminum atoms of the liquid PMAO composition used.

Steps (b) and (c)

The precipitation rate of the solid PMAO composition produced by heating after the additional addition of a toluene solution of the liquid PMAO composition was 88.7% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 40.7 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 25.7 µm and the uniformity was 0.255. Meanwhile, the volume-based median diameter d(0.5) of the solid PMAO composition produced in the step (a) before the additional addition of a toluene solution of the liquid PMAO composition was 6.4 µm and the uniformity was 0.246.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 35 min. Based on the mass of the obtained dry polymer, the polymerization activity of this catalyst was found to be 26.6 kg-PE/g-cat·hr.

(c) Collected Polymer Evaluation

The particle diameter of the obtained polymer was 410 µm, and Span was 1.21. Also, the bulk density (BD) of the polymer was determined to be 0.364 g/cc.

Example 16

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, a toluene solution of the liquid PMAO composition prepared in Preliminary Experiment 1 (Al/O=1.17) in the step (a) was used, and the additional addition amount of a toluene solution of the liquid PMAO composition prepared in Preliminary Experiment 3 (Al/O=1.20) in the step (b) was set to 184 mol %-Al.

Step (a)

The precipitation rate of the solid PMAO composition produced before the additional addition of a toluene solution of the liquid PMAO composition was 99.8% based on aluminum atoms of the liquid PMAO composition used.

Steps (b) and (c)

The precipitation rate of the solid PMAO composition produced by heating after the additional addition of a toluene solution of the liquid PMAO composition was 91.6% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.5 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 29.5 µm and the uniformity was 0.259. Meanwhile, the volume-based median diameter d(0.5) of the solid PMAO composition produced in the step (a) before the additional addition of a toluene solution of the liquid PMAO composition was 5.9 µm and the uniformity was 0.240.

(c) Circularity

The solid PMAO composition obtained in the step (c) was washed with toluene and then subjected to drying treatment, and SEM measurement was carried out. When analyzed by Mac-View (ver. 4), the circularity was 0.83.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 45 min. Based on the mass of the obtained dry polymer, the polymerization activity of this catalyst was found to be 22.4 kg-PE/g-cat·hr.

(c) Collected Polymer Evaluation

The particle diameter of the obtained polymer was 413 and Span was 1.16. Also, the bulk density (BD) of the polymer was determined to be 0.359 g/cc.

Example 17

(1) Synthesis of Solid PMAO Composition

A solid PMAO composition was prepared in the same manner as in Example 1, except that a glass autoclave (manufactured by Taiatsu Techno Corporation) having an internal volume of 1 L and equipped with a stirring device was used, a toluene solution of the liquid PMAO composition prepared in Preliminary Experiment 1 (Al/O=1.17) in the step (a) was used, and the additional addition amount of a toluene solution of the liquid PMAO composition prepared in Preliminary Experiment 3 (Al/O=1.20) in the step (b) was set to 300 mol %-Al.

Step (a)

The precipitation rate of the solid PMAO composition produced before the additional addition of a toluene solution of the liquid PMAO composition was 99.3% based on aluminum atoms of the liquid PMAO composition used.

Steps (b) and (c)

The precipitation rate of the solid PMAO composition produced by heating after the additional addition of a toluene solution of the liquid PMAO composition was 90.1% based on aluminum atoms of the liquid PMAO composition used.

(2) Analysis of Solid PMAO Composition Obtained in Step (c)

(a) Aluminum Content

The aluminum content of the dried solid PMAO composition was measured and found to be 41.0 wt %-Al.

(b) Shape Evaluation

After washing with toluene, particle size distribution was evaluated by Mastersizer 2000 Hydro S using a toluene slurry of the solid PMAO composition. As a result, the volume-based median diameter d(0.5) of the solid PMAO composition produced by heating after the additional addition of a toluene solution of the liquid PMAO composition was 34.7 µm and the uniformity was 0.249. Meanwhile, the volume-based median diameter d(0.5) of the solid PMAO composition produced in the step (a) before the additional addition of a toluene solution of the liquid PMAO composition was 6.0 µm and the uniformity was 0.236.

(3) Ethylene Polymerization Evaluation (a) Preparation of Bisindenylzirconium Dichloride (BI)-Supported Solid PMAO Catalyst A BI-supported solid PMAO catalyst was prepared by loading BI in the same manner as in Example 1(3)a).

(b) Ethylene Polymerization Evaluation

Polymerization evaluation was carried out using the prepared BI-supported solid PMAO catalyst in the same manner as in Example 1(3)b) except that the polymerization time was 50 min. Based on the mass of the obtained dry polymer, the polymerization activity of this catalyst was found to be 18.4 kg-PE/g-cat·hr.

(c) Collected Polymer Evaluation

The particle diameter of the obtained polymer was 656 µm, and Span was 1.23. Also, the bulk density (BD) of the polymer was determined to be 0.344 g/cc.

TABLE 1

| Examples | Al/O (1) (mol/mol) | MAO Al concentration (wt %) | d(0.5) (µm) | Uniformity | Precipitation rate (%) |
|---|---|---|---|---|---|
| 1 | 1.17 | 8.67 | 6.4 | 0.231 | 98.6 |
| 2 | 1.17 | 8.67 | 6.1 | 0.237 | 98.3 |
| 3 | 1.17 | 8.67 | 6.2 | 0.235 | 98.2 |
| 4 | 1.17 | 8.67 | 6.0 | 0.238 | 98.7 |
| 5 | 1.17 | 8.67 | 6.3 | 0.236 | 98.8 |
| 6 | 1.17 | 8.67 | 6.0 | 0.232 | 98.8 |
| 7 | 1.17 | 8.67 | 6.1 | 0.235 | 98.5 |
| 8 | 1.17 | 8.67 | 6.9 | 0.244 | 98.6 |
| 9 | 1.17 | 8.67 | 7.3 | 0.243 | 98.3 |
| 10 | 1.20 | 8.8 | 15.0 | 0.235 | 96.7 |
| 11 | 1.20 | 8.8 | 9.2 | 0.227 | 97.0 |
| 12 | 1.15 | 8.9 | 5.0 | 0.242 | 100 |
| 13 | 1.17 | 8.67 | 6.1 | 0.242 | 99.1 |
| 14 | 1.17 | 8.67 | 6.2 | 0.238 | 99.5 |
| 15 | 1.17 | 8.67 | 6.4 | 0.246 | 99.6 |
| 16 | 1.17 | 8.67 | 5.9 | 0.240 | 99.8 |
| 17 | 1.17 | 8.67 | 6.0 | 0.236 | 99.3 |

TABLE 1-continued

| Examples | Al/O (2/3) (mol/mol) | Addition amount (mol %) | Additional MAO Al concentration (wt %) | Total Al concentration (wt %) | Precipitation rate (%) |
|---|---|---|---|---|---|
| 1 | 1.17 | 10.2 | 8.67 | 0.92 | 99.4 |
| 2 | 1.17 | 30.0 | 8.67 | 2.11 | 98.3 |
| 3 | 1.17 | 51.0 | 8.67 | 3.03 | 98.0 |
| 4 | 1.17 | 93.6 | 8.67 | 4.25 | 97.0 |
| 5 | 1.17 | 50.9 | 8.67 | 2.99 | 99.8 |
| 6 | 1.17 | 94.3 | 8.67 | 3.87 | 97.5 |
| 7 | 1.17 | 98.5 | 8.67 | 3.3 | 96.6 |
| 8 | 2) 1.17 | 31.8 | 8.67 | 2.67 | 99.3 |
|   | 3) 1.17 | 49.5 | 8.67 | 2.88 | 98.5 |
| 9 | 2) 1.17 | 31 | 8.67 | 2.97 | 99.0 |
|   | 3) 1.17 | 100.6 | 8.67 | 4.54 | 98.8 |
| 10 | 1.20 | 52.0 | 8.8 | 3.2 | 92.2 |
| 11 | 1.17 | 51.0 | 8.67 | 3.19 | 97.2 |
| 12 | 1.15 | 50.5 | 8.9 | 2.99 | 99.9 |
| 13 | 1.40 | 98 | 9.03 | 4.42 | 81.5 |
| 14 | 1.24 | 95 | 9.03 | 4.33 | 91.2 |
| 15 | 1.24 | 154 | 9.03 | 5.4 | 88.7 |
| 16 | 1.2 | 184 | 8.8 | 5.68 | 91.6 |
| 17 | 1.2 | 300 | 8.8 | 6.59 | 90.1 |

| Examples | d(0.5) (µm) | Uniformity | Amount of Al (wt %) | Circularity |
|---|---|---|---|---|
| 1 | 8.3 | 0.263 | 41.1 | |
| 2 | 11.0 | 0.252 | 40.5 | |
| 3 | 14.0 | 0.232 | 41.6 | 0.61 |
| 4 | 19.0 | 0.235 | 40.9 | |
| 5 | 13.3 | 0.233 | 41.8 | |
| 6 | 21.1 | 0.234 | 40.6 | |
| 7 | 24.0 | 0.252 | 40.1 | 0.70 |
| 8 | 12.4 | 0.277 | 40.3 | |
|   | 18.6 | 0.28 | | |
| 9 | 12.5 | 0.28 | 40.9 | 0.74 |
|   | 22.2 | 0.28 | | |
| 10 | 31.7 | 0.275 | 41.1 | |
| 11 | 17.1 | 0.255 | 41.5 | |
| 12 | 10.8 | 0.252 | 42.2 | |
| 13 | 12.4 | 0.252 | 42.1 | |
| 14 | 19.8 | 0.249 | 41.2 | |
| 15 | 25.7 | 0.255 | 40.7 | |
| 16 | 29.5 | 0.259 | 41.5 | 0.83 |
| 17 | 34.7 | 0.249 | 41.0 | |

TABLE 2

| Examples | Activity (kg/g-cat · hr) | Polymer d(0.5) (µm) | Span | BD |
|---|---|---|---|---|
| 1 | 18.0 | 174 | 0.833 | 0.390 |
| 2 | 19.5 | 286 | 0.741 | 0.381 |
| 3 | 16.6 | 299 | 0.888 | 0.411 |
| 4 | 12.5 | 184 | 1.02 | 0.301 |
| 5 | 11.6 | 304 | 0.722 | 0.405 |
| 6 | 15.0 | 413 | 0.96 | 0.339 |
| 7 | 16.5 | 415 | 0.98 | 0.338 |
| 8 | 10.5 | 295 | 0.88 | 0.356 |
| 9 | 10.2 | 305 | 0.99 | 0.334 |
| 10 | 11.0 | 350 | 1.20 | 0.310 |
| 11 | 15.2 | 366 | 0.90 | 0.355 |
| 12 | 22.5 | 296 | 0.743 | 0.41 |
| 13 | 25.3 | 311 | 0.83 | 0.405 |
| 14 | 32.0 | 480 | 1.14 | 0.364 |

TABLE 2-continued

| Examples | Activity (kg/g-cat · hr) | Polymer d(0.5) (μm) | Span | BD |
|---|---|---|---|---|
| 15 | 26.6 | 410 | 1.21 | 0.364 |
| 16 | 22.4 | 413 | 1.16 | 0.359 |
| 17 | 18.4 | 656 | 1.23 | 0.344 |

INDUSTRIAL APPLICABILITY

The present invention is useful in the field of olefin polymerization.

The invention claimed is:

1. A method for producing a solid PMAO composition, comprising:
   (a) a step of heating an aromatic hydrocarbon solution (liquid PMAO composition A) containing a poly-methylaluminoxane containing a unit represented by a following general formula (I) (hereinafter sometimes referred to as PMAO) and trimethylaluminum (hereinafter sometimes referred to as TMAL) to precipitate a solid PMAO composition containing the PMAO and TMAL,
   wherein a precipitation amount of the solid PMAO composition in the step (a) being 70% or more based on aluminum of the PMAO and TMAL contained in the liquid PMAO composition A;
   (b) a step of adding an aromatic hydrocarbon solution (liquid PMAO composition B) containing a PMAO containing a unit represented by the following general formula (I) and TMAL to a solution containing the solid PMAO composition obtained in the step (a); and
   (c) a step of heating the solution obtained in the step (b) to precipitate a solid PMAO composition,
   wherein a precipitation amount of the solid PMAO composition in the step (c) being 70% or more based on aluminum of the PMAO and TMAL contained in the liquid PMAO compositions A and B,
   a median diameter d2 of the solid PMAO composition produced in the step (c) is larger than a median diameter d1 of the solid PMAO composition produced in the step (a), and a heating temperature in the step (c) is the same as or different from a heating temperature in the step (a);

[C1]

$$[(Me)AlO]_n— \quad (I)$$

In the formula, n represents an integer of 10 to 50.

2. The production method according to claim 1, wherein a PMAO concentration of the liquid PMAO composition A is 5 mass % or more, and the liquid PMAO composition B is added such that a PMAO concentration in the solution obtained by adding the liquid PMAO composition B in the step (b) is 0.5 mass % or more.

3. The production method according to claim 1, wherein the median diameter d1 of the solid PMAO composition produced in the step (a) is in the range of 1 μm to 20 μm, and
   the median diameter d2 of the solid PMAO composition produced in the step (c) is in the range of 8 μm to 70 μm.

4. The production method according to claim 1, wherein the step (b) and the step (c) are carried out one more time or more after step (c) by using the solution containing the solid PMAO composition obtained in step (c),
   the median diameter d3 of the solid PMAO composition produced in the second step (c) being larger than the median diameter d2 of the solid PMAO composition produced in the first step (c).

5. The production method according to claim 4, wherein the median diameter d1 of the solid PMAO composition produced in the step (a) is in the range of 1 μm to 20 μm;
   the median diameter d2 of the solid PMAO composition produced in the first step (c) is in the range of 5 μm to 35 μm; and
   the median diameter d3 of the solid PMAO composition produced in the second step (c) is in the range of 10 μm to 70 μm.

6. The production method according to claim 1, wherein the liquid PMAO composition B used in the step (b) has an Al/O ratio larger than the Al/O ratio of the liquid PMAO composition A used in the step (a).

7. The production method according to claim 1, wherein the solid PMAO composition comprises at least the PMAO and TMAL.

8. The production method according to claim 1, wherein the solid PMAO composition is in a solid state at a temperature of 30° C. or less.

9. The production method according to claim 1, wherein the solid PMAO composition has a circularity in the range of 0.5 to 1.

10. The production method according to claim 1, wherein the solid PMAO composition has a polymerization activity of a catalyst of 10 kg-PE/g-cat·hr or more as measured in an ethylene slurry polymerization carried out under the following conditions as a bisindenylzirconium dichloride (BI)-supported solid PMAO catalyst having Al/Zr=200;
Ethylene slurry polymerization conditions:
    Polymerization pressure: 0.8 MPa, polymerization temperature: 80±1° C., polymerization time: within 1 hr, solvent:hexane (BI-supported solid PMAO catalyst: solvent=18.1 mg: 800 ml), scavenger: 0.5 mmol triethylaluminum, kg-PE in the polymerization activity units kg-PE/g-cat·hr is the mass of produced polyethylene, and g-cat is the mass of BI-supported solid PMAO catalyst.

11. A solid PMAO composition which comprises a polymethylaluminoxane containing a unit represented by a following general formula (I) (hereinafter sometimes referred to as PMAO) and trimethylaluminum (hereinafter sometimes referred to as TMAL), has a median diameter d within the range of 8 μm to 70 μm, and has a polymerization activity of a catalyst of 10 kg-PE/g-cat·hr or more as measured in an ethylene slurry polymerization carried out under the following conditions as a bisindenylzirconium dichloride (BI)-supported solid PMAO catalyst having Al/Zr=200;
Ethylene slurry polymerization conditions:
    Polymerization pressure: 0.8 MPa, polymerization temperature: 80±1° C., polymerization time: within 1 hr, solvent:hexane (BI-supported solid PMAO catalyst: solvent=18.1 mg:800 ml), scavenger: 0.5 mmol triethylaluminum, kg-PE in the polymerization activity unit kg-PE/g-cat·hr is the mass of produced polyethylene, and g-cat is the mass of BI-supported solid PMAO catalyst;

[C2]

$$[(Me)AlO]_n— \quad (I)$$

In the formula, n represents an integer of 10 to 50).

12. The solid PMAO composition according to claim 11, wherein the solid PMAO composition is in a solid state at a temperature of 30° C. or less.

13. The solid PMAO composition according to claim 11, wherein the solid PMAO composition has a circularity in the range of 0.5 to 1.

14. The solid PMAO composition according to claim 11, wherein an aluminum content is in the range of 38 mass % to 43 mass %.

15. The solid PMAO composition according to claim 11, wherein a mole fraction Me (TMAL) of a methyl group derived from TMAL is 25 mol % or less.

16. A catalyst for polymerization of olefins, which comprises a solid PMAO composition according to claim 11 and a transition metal compound represented by a following general formula (II) as catalyst components;

[C3]

$$MR^5R^6R^7R^8 \quad (II)$$

In the formula, M represents a transition metal element, at least one of $R^5$, $R^6$, $R^7$ and $R^8$ is an organic group having a cycloalkadienyl skeleton, and the rest are independently an alkyl group, an alkoxy group, an aryloxy group, an alkylsilyl group, an alkylamido group, an alkylimido group, an alkylamino group, an alkylimino group, or a halogen atom. When two or more of $R^5$, $R^6$, $R^7$ and $R^8$ are each an organic group having a cycloalkadienyl skeleton, at least two of the organic groups having a cycloalkadienyl skeleton may be crosslinked by carbon, silicon or germanium.

17. A catalyst for polymerization of olefins, which is a composite comprising a solid PMAO composition according to claim 11, a transition metal compound represented by a following general formula (II), and an olefin prepolymer;

[C4]

$$MR^5R^6R^7R^8 \quad (II)$$

In the formula, M represents a transition metal element, at least one of $R^5$, $R^6$, $R^7$ and $R^8$ is an organic group having a cycloalkadienyl skeleton, and the rest are independently an alkyl group, an alkoxy group, an aryloxy group, an alkylsilyl group, an alkylamido group, an alkylimido group, an alkylamino group, an alkylimino group, or a halogen atom. When two or more of $R^5$, $R^6$, $R^7$ and $R^8$ are each an organic group having a cycloalkadienyl skeleton, at least two of the organic groups having a cycloalkadienyl skeleton may be crosslinked by carbon, silicon or germanium.

18. The polymerization catalyst according to claim 17, wherein the olefin prepolymer is an olefin homopolymer or copolymer.

19. The polymerization catalyst according to claim 18, wherein the olefin homopolymer is an ethylene homopolymer or a propylene homopolymer, and the olefin copolymer is a copolymer of ethylene and/or propylene and hexene-1 and/or octene-1.

20. The polymerization catalyst according to claim 17, wherein a mass ratio (referred to as a degree of prepolymerization) of the olefin prepolymer to the total of the solid PMAO composition and the transition metal compound represented by the general formula (II) is in the range of 0.1 to 100.

21. A method for producing a polyolefin, which comprises polymerizing an olefin using the catalyst according to claim 16.

* * * * *